(12) United States Patent
Liu et al.

(10) Patent No.: US 9,373,336 B2
(45) Date of Patent: Jun. 21, 2016

(54) METHOD AND DEVICE FOR AUDIO RECOGNITION

(71) Applicant: Tencent Technology (Shenzhen) Company Limited, Shenzhen (CN)

(72) Inventors: Hailong Liu, Shenzhen (CN); Dadong Xie, Shenzhen (CN); Jie Hou, Shenzhen (CN); Bin Xiao, Shenzhen (CN); Xiao Liu, Shenzhen (CN); Bo Chen, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 239 days.

(21) Appl. No.: 14/103,753

(22) Filed: Dec. 11, 2013

(65) Prior Publication Data

US 2014/0219461 A1 Aug. 7, 2014

Related U.S. Application Data

(63) Continuation of application No. PCT/CN2013/085309, filed on Oct. 16, 2013.

(30) Foreign Application Priority Data

Feb. 4, 2013 (CN) .......................... 2013 1 0042408

(51) Int. Cl.
*H04R 29/00* (2006.01)
*G10L 19/02* (2013.01)
(Continued)

(52) U.S. Cl.
CPC .......... *G10L 19/02* (2013.01); *G06F 17/30743* (2013.01); *G10L 19/018* (2013.01); *G10L 25/18* (2013.01); *G10L 25/54* (2013.01)

(58) Field of Classification Search
CPC .................... G06F 17/30743; G06F 17/30026; G10L 19/00
USPC ....................... 381/56, 30; 704/231
See application file for complete search history.

(56) References Cited

U.S. PATENT DOCUMENTS 5,473,759 A * 12/1995 Slaney .................... G10L 19/02
704/217
6,092,039 A * 7/2000 Zingher .................. G10L 19/00
704/203

(Continued)

FOREIGN PATENT DOCUMENTS

| CN | 102053998 A | 5/2011 |
| CN | 102063904 A | 5/2011 |

(Continued)

OTHER PUBLICATIONS

Tencent Technology, ISR, PCT/CN2013/085309, Jan. 2, 2014, 4pgs.

*Primary Examiner* — Alexander Jamal
(74) *Attorney, Agent, or Firm* — Morgan, Lewis & Bockius LLP

(57) ABSTRACT

A method and device for performing audio recognition, including: collecting a first audio document to be recognized; initiating calculation of first characteristic information of the first audio document, including: conducting time-frequency analysis for the first audio document to generate a first preset number of phase channels; and extracting at least one peak value characteristic point from each phase channel of the first preset number of phrase channels, where the at least one peak value characteristic point of each phase channel constitutes the peak value characteristic point sequence of said each phase channel; and obtaining a recognition result for the first audio document, wherein the recognition result is identified based on the first characteristic information, and wherein the first characteristic information is calculated based on the respective peak value characteristic point sequences of the preset number of phase channels.

20 Claims, 9 Drawing Sheets

(51) Int. Cl.
*G10L 19/018* (2013.01)
*G10L 25/18* (2013.01)
*G06F 17/30* (2006.01)
*G10L 25/54* (2013.01)

(56) References Cited

U.S. PATENT DOCUMENTS

2005/0149321 A1 7/2005 Kabi et al.
2007/0195963 A1 8/2007 Ko et al.
2007/0294295 A1 12/2007 Finkelstein et al.
2009/0177466 A1 7/2009 Rui et al.
2009/0205483 A1* 8/2009 Kim .................... G10H 1/0008 84/622
2009/0271182 A1 10/2009 Athineos et al.
2011/0173208 A1* 7/2011 Vogel .................... G10L 25/48 707/746

FOREIGN PATENT DOCUMENTS

| | | |
|---|---|---|
| CN | 102332262 A | 1/2012 |
| CN | 102479505 A | 5/2012 |
| KR | 20090083098 A | 8/2009 |
| TW | 201222526 A | 6/2012 |
| TW | 201248450 A | 12/2012 |

* cited by examiner

METHOD AND DEVICE FOR AUDIO RECOGNITION

RELATED APPLICATIONS

This application is a continuation application of PCT Patent Application No. PCT/CN2013/085309, entitled "Method and Device for Audio Recognition" filed Oct. 16, 2013, which claims priority to Chinese Patent Application Serial No. 201310042408.0, entitled "Method and Device for Audio Recognition", filed Feb. 4, 2013, both of which are incorporated herein by reference in their entirety.

FIELD OF THE INVENTION

The present application relates to the computational technical field, especially relates to a method and device for audio recognition.

BACKGROUND OF THE INVENTION

With the development of the Internet, the Internet has been an indispensable information obtaining tool in people's lives. Using Internet devices to realize the recognition of unknown audio is becoming a new application trend. The conventional audio recognition methods mainly include the following steps: firstly, the users input some basic information of unknown audio document manually, for example, by inputting the lyrics contained in the unknown audio document, the name of the unknown audio document, the singer of the unknown audio document, and so on; secondly, based on the input basic information, the entire information of the unknown audio document is searched by the Internet device (such as a terminal or a server on the Internet). As such, it is necessary to input the basic information manually in conventional audio recognition method. However, under most circumstances, the user may not know the basic information of the unknown audio document, or the basic information of the unknown audio document possessed by the user is incorrect, so the information cannot be effectively provided. For example, the user may hear a small piece of music in a surrounding environment, but does not know other information of the music, so effective input cannot be performed; or the user is able to hum a small piece of rhythm of a certain music, but does not know other information of the music, so effective input cannot be performed. Under above mentioned circumstances, the unknown audio document cannot be recognized with the conventional audio recognition methods, which detract from the intelligent functions of the Internet devices.

SUMMARY

In one aspect, a method of performing audio recognition includes: at a device having one or more processors and memory: collecting a first audio document to be recognized in response to an audio recognition request; initiating calculation of first characteristic information of the first audio document, including: conducting time-frequency analysis for the first audio document to generate a first preset number of phase channels for the first audio document; and extracting at least one peak value characteristic point from each phase channel of the first preset number of phrase channels, wherein the at least one peak value characteristic point of each phase channel constitutes the peak value characteristic point sequence of said each phase channel; and obtaining a recognition result for the first audio document, wherein the recognition result includes at least one second audio document having second characteristic information matching the first characteristic information in accordance with one or more preset criteria, and wherein the first characteristic information is calculated based on the respective peak value characteristic point sequences of the preset number of phase channels.

In some embodiments, the method is performed on a client device, and further includes: sending the respective peak value characteristic point sequences of the preset number of phase channels to a server, where the server completes the calculation of the first characteristic information based on the respective peak value characteristic point sequences of the preset number of phase channels. In some embodiments, the method further includes: before the sending, performing a first type of compression on respective time values for the respective peak value characteristic point sequences and a second type of compression on respective frequency values for the respective peak value characteristic point sequences.

In some embodiments, the method is performed on a server device, and further includes: pre-establishing a database of a plurality of known audio documents, each known audio document having a respective unique track identifier, the pre-establishing further includes: calculating respective characteristic information for each of the plurality of known audio documents, wherein the respective characteristic information for each of the plurality of known audio documents includes a respective collection of audio fingerprint sequences for said each known audio document, and wherein each of the respective collection of audio fingerprint sequences for said each known audio document has a respective hashcode; and storing the respective collections of audio fingerprint sequences for the plurality of known audio documents in a Hash table according to their respective hashcodes.

In some embodiments, the recognition process for the first audio document further include: continuing the calculation of the first characteristic information of the first audio document, including: performing pairing processing for each peak value feature point in the peak value feature point sequence of each of the preset number of phase channels of the first audio document, to form a peak value feature point pair sequence of said each phase channel for the first audio document; conducting Hash calculation for each of the peak value feature point pair sequences in each phase channel of the first audio document to obtain a respective audio fingerprint sequence corresponding to each of the preset number of phase channels of the first audio document, where the audio fingerprint sequences corresponding to the first preset number of phase channels together constitute the first characteristic information of the first audio document; comparing the first characteristic information with the respective characteristic information of each known audio document stored in the pre-established database to obtain a respective comparison result; conducting weighting processing for the respective track identifier of the each known audio document in the pre-established database according to the respective comparison result; according to an order of decreasing weight scores for the respective track identifiers, selecting the respective characteristic information of a second preset number of known audio documents from the pre-established database to construct a document candidate list; calculating a respective time dependency between the first characteristic information and the respective characteristic information of each known audio document in the document candidate list; and selecting the at least one second characteristic information matching the first characteristic information from the document candidate list, wherein the respective time dependency between the second characteristic information and the first characteristic information exceeds a preset threshold value.

In one aspect, one or more devices comprising one or more processors and memory are configured to perform the above methods.

BRIEF DESCRIPTION OF THE DRAWINGS

In order to explain the embodiments of the present application, the following drawings are used to illustrate various aspects of the invention.

Like reference numerals refer to corresponding parts throughout the several views of the drawings.

DESCRIPTION OF EMBODIMENTS

As described herein, in some embodiments, the characteristic information of an audio document is the audio fingerprint of the audio document, that is, the first characteristic information of the first audio document is the audio fingerprint of the first audio document; and the second characteristic information of the second audio document is the audio fingerprint of the second audio document.

In some embodiments, the audio fingerprint of an audio document refers to the compact digital signature that represents the important acoustic characteristics of the audio document and is based on the content of the audio document. The audio fingerprint of an audio document requires similarity in perception or content, and has properties such as distinguishability, robustness, granularity, and other basic characteristics. In some embodiments, distinguishability refers to the property that the audio fingerprints of different audio documents should have great differences, while the audio fingerprints of an original record and low-fidelity copies of the original audio document should have small differences. Robustness refers the property that the audio document can still be recognized after experiencing many kinds of audio format conversions, channel noise interferences, and so on.

Granularity refers to the property that recognition can be achieved even for a very short audio document (i.e. the length of audio document is shorter than e.g., 5 s to 10 s). Besides, the audio fingerprints of audio documents in different application scenarios may have more characteristics. For example, in the client-side application scenario, easy of calculation is required for the audio fingerprints of audio documents, so the quick and real-time audio fingerprint calculations can be realized in the client device with limited calculation resources. For another example, in the wireless network application scenario, data compactness is required for the audio fingerprints of audio documents, that is, the data size should be small to adapt the transmission of wireless networks.

The following will introduce the audio recognition methods in accordance with some embodiments in detail combined with attached drawing 1A-1F.

Figure 1A:
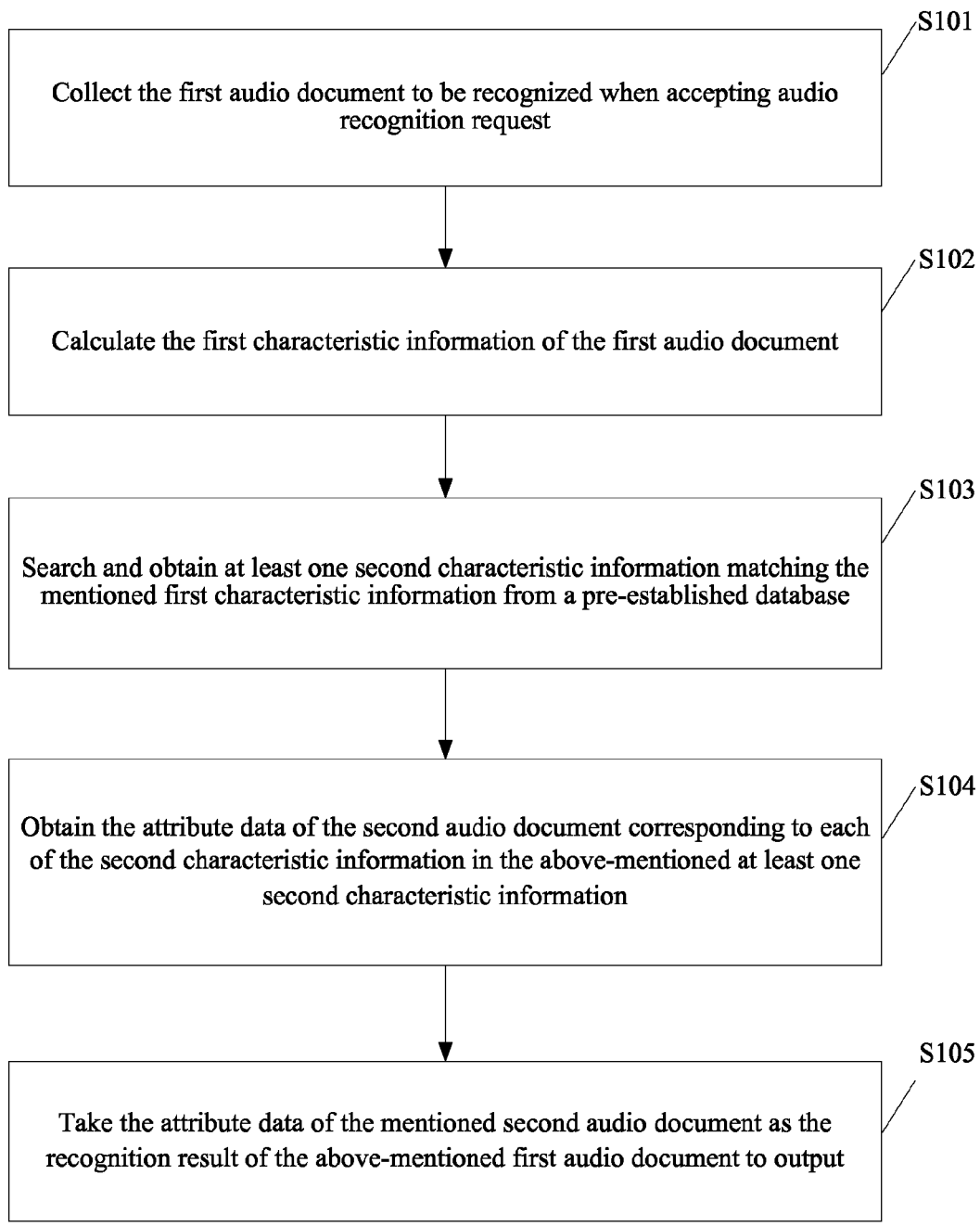
FIG. 1A is a flowchart diagram of audio recognition method in accordance with some embodiments.

Please refer to FIG. 1A, a flowchart diagram of an audio recognition method in accordance with some embodiments. The method can include the following Steps of S101 to S105.

S101, collect the first audio document to be recognized when receiving audio recognition request. For example, an audio recognition request is optionally generated by a user on a client device (e.g., a smartphone). When receiving the audio recognition request, the client device optionally starts a recording device (e.g., a built-in microphone and recorder) to capture the sound in the surrounding environment. In some embodiments, the client device optionally downloads an audio clip from the Internet as the first audio document at the direction of the user. In some embodiments, the client device optionally makes a copy of an audio clip stored locally as the first audio document at the direction of the user. In some embodiments, the client device optionally stores audio signals in a designated signal line (e.g., an audio input line, or an audio input channel) as the first audio document at the direction of the user. In some embodiments, the client device automatically initiating the collection of the first audio document when a preset trigger for initiating audio recognition is satisfied. For example, the preset trigger may be that, if the client device captures any audio signal from the surrounding environment and/or from a particular audio channel that is more than a certain length of time or that is above a certain volume level, the audio recognition request is triggered.

In some embodiments, the first audio document is one of: the audio segments in movies, the audio segments in television plays, the audio segments in television programs, the audio data broadcast by music radio stations, the audio data delivered by human beings (such as the hummed music or song segments), etc. If the user wants to know the information of an unknown audio document, such as the song's name, the singer, the album's name and the lyrics of the audio document, he or she can initiate the audio query request. In this step, when receiving the audio recognition request sent by user, the device collects the first audio document to be recognized. In some embodiments, the collection process of this step can optionally include the following two implementation modes:

In the first implementation mode, when receiving the audio query request sent by user, this step can start the recording function to record the first audio document requested to be recognized by the user in real-time.

In the second implementation mode, when receiving the audio query request sent by user, this step can receive the first audio document requested to be recognized and uploaded by the user.

In some embodiments, the first audio document is a digital audio document with sampling frequency of 8 KHz, PCM (Pulse-code modulation) type with 16 bit quantization.

S102, calculate the first characteristic information of the first audio document.

In some embodiments, the first characteristic information of the first audio document is the audio fingerprint of the first audio document. In some embodiments, the audio fingerprint of the first audio document refers to the compact digital signature representing the important acoustic characteristics of the first audio document, and based on the content of the first audio document. In this step, the digital version of the first audio document that has been collected is used in the calculation to obtain the first characteristic information of the first audio document.

In some embodiments, this step is performed on the same device (e.g., a client device or a server). In some embodiments, this step is performed by the client device and the server device working collaboratively. More details of this step are described below.

S103, search and obtain at least one second characteristic information matching the first characteristic information from a pre-established database.

In some embodiments, the pre-established database stores the respective identifier of at least one audio document, the respective characteristic information of the at least one audio document, and the respective attribute data of the at least one audio document. In some embodiments, the audio documents stored in the pre-established database include: the audio segments in movies, the audio segments in television plays, the audio segments in television programs, songs, music and so on. In some embodiments, the respective identifiers of the audio documents are expressed by TrackIDs. For example, the respective identifier of audio document 1 can be expressed as TrackID-1, the respective identifier of audio document 2 can be expressed as TrackID-2; each TrackID can only be used as a unique identifier for one respective audio document.

In some embodiments, the characteristic information of an audio document is the audio fingerprint of the audio document. For example, the characteristic information of audio document 1 is the audio fingerprint of audio document 1, the characteristic information of audio document 2 is the audio fingerprint of audio document 2. In some embodiments, the attribute data of an audio document include but are not limited to at least one of the following data: the name of the audio document, album information of the audio document, URL address of the audio document, and lyrics of the audio document. In this step, in some embodiments, the second characteristic information matching the first characteristic information means that the second characteristic information is identical to the first characteristic information. In some embodiments, the second characteristic information matching the first characteristic information means that the degree of similarity between the second characteristic information and the first characteristic information reaches a preset degree of similarity. For example: if the preset degree of similarity is 90%, and if the degree of similarity between the second characteristic information and the first characteristic information reaches 90% or over 90%, the second characteristic information is considered to match the first characteristic information, e.g., by the recognition device.

In some embodiments, this step is performed on the server device that receives the audio recognition request and at least some information about the first audio document (e.g., the first characteristic information or other information from which the first characteristic information may be calculated) from the client device. In some embodiments, this step is performed on the same device as that received the audio recognition request.

S104, obtain the attribute data of the second audio document corresponding to each of the second characteristic information in the above-mentioned at least one second characteristic information.

The above mentioned Step S103 searches out at least one second characteristic information matching the first characteristic information from the pre-established database. In some embodiments, each characteristic information in the above-mentioned at least one second characteristic information corresponds to a respective second audio document. By the above-mentioned Step S103, at least one second audio document matching the first audio document is recognized, which suggests that this first audio document may be one of the recognized one or more second audio documents, or this first audio document may be an audio segment of at least one of the recognized second audio document(s). In this step, the attribute data of the recognized at least one second audio document matching the first audio document is obtained.

In some embodiments, this step is performed on the server.

S105, take the attribute data of the above-mentioned second audio document as the recognition result of the above-mentioned first audio document to output. For example, in some embodiments, the server provides the attribute data of the above-mentioned second audio document to the client device as the result of the audio recognition request.

In some embodiments, this step can use the attribute data of all audio documents in the at least one second audio document that have been obtained in Step S104 as the recognition result of the first audio document, and output them all to the user. In some embodiments, this step can also select only some of the audio documents from the at least one audio document that have been obtained in Step S104, and output the attribute data of the selected audio documents as the recognition result of the above-mentioned first audio document. According to the above-mentioned recognition result, the user can learn the attribute data of the first audio document that is the subject of the query request. For example, the user can learn the attribute data of the first audio document, such as the song's name, its singer, its album's name, its lyrics, and so on.

In some embodiments, the method of audio recognition include: when receiving an audio recognition request, the first audio document to be recognized can be collected automatically. It is not necessary for the user to manually input the basic information of the first audio document to be recognized, which advances the intelligent functions of audio recognition. In addition, the method of audio recognition include, calculating the first characteristic information of the above-mentioned first audio document; searching and obtaining at least one second characteristic information matching the above-mentioned first characteristic information in a pre-established database; based on the first characteristic information, obtaining the attribute data of the matched second audio document(s) from the preset database, and taking the attribute data of the above-mentioned second audio document(s) as the recognition result of the above-mentioned first audio document to output. Embodiments of the present application are based on the characteristic information for audio recognition, when the audio document is determined, the characteristic information of that audio document is also determined Performing the audio recognition based on the determined characteristic information advances the accuracy of audio recognition and advances the intelligent functions of audio recognition as well.

The following will introduce each step of audio recognition method shown in FIG. 1A in more detail.

Figure 1B:
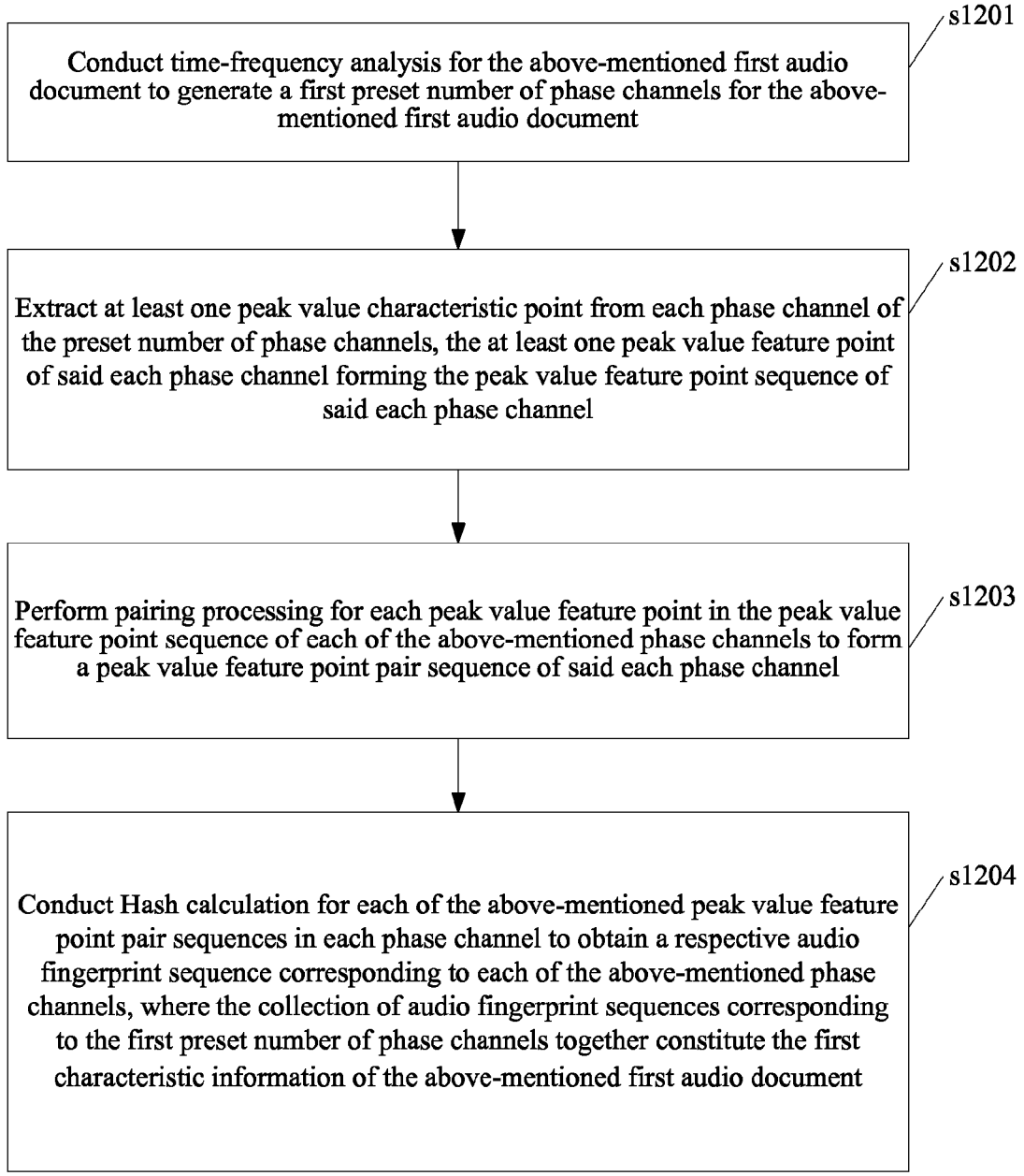
FIG. 1B is the flowchart diagram of Step S102 shown in FIG. 1A in accordance with some embodiments.

Refer to FIG. 1B, which is the flowchart diagram of Step S102 shown in FIG. 1A in accordance with some embodiments. The Step S102 can include the following Step s1201-Step s1204, in accordance with some embodiments.

s1201, conduct time-frequency analysis for the mentioned first audio document, to generate a first preset number of phase channels for the above-mentioned first audio document.

In some embodiments, the value of the first preset number is set according to the actual current condition. In some embodiments, the specific process for setting the value of the preset number takes into account various factors influenced by the first audio document. For example, the value of the first preset number can be set according to the signal to noise ratio of the first audio document, and so on.

In some embodiments, the first preset number is expressed as M, wherein M is a positive integer. In this step, the time-frequency analysis can be based on performing STFT (Short-Time Fourier Transform) on the time domain signal of the digital version of the first audio document, which can produce a two dimensional time-frequency graph of the first audio document. In some embodiments, the two dimensional time-frequency graph of the first audio document is split into M time-frequency sub-graphs, wherein each time-frequency sub-graph corresponds to a respective one of the M phase channels of the first audio document. For example, in the M time-frequency sub-graphs of the M phase channels, the phase channel 1 corresponds to the time-frequency sub-graph 1; the phase channel 2 corresponds to the time-frequency sub-graph 2; and correspondingly, the phase channel M corresponds to the time-frequency sub-graph M.

s1202, extract at least one peak value feature point from each phase channel of the preset number of phase channels, the at least one peak value feature point of said each phase channel forming the peak value feature point sequence of said each phase channel.

As mentioned above, in the M phase channels, each phase channel corresponds to a respective time-frequency sub-graph. In this step, in some embodiments, the process for extracting the peak value feature point(s) of each phase channel include: 1) in the respective time-frequency sub-graph corresponding to said each phase channel, analyzing the energy value of each feature point; 2) according to the energy value of each feature point, selecting the feature point having the maximum energy value within a given rectangular neighborhood as the peak value feature point. According to the above mentioned steps 1) and 2), at least one peak value feature point can be extracted for each phase channel.

In some embodiments, the size parameter of the rectangular neighborhood is set according to the actual need. For example, in some embodiments, the process for setting the size of the rectangular neighborhood takes into consideration one or more of the following factors, including: the total number of feature points in the time-frequency sub-graph, the distribution condition of the feature points in the time-frequency sub-graph, and so on. In some embodiments, in the M phase channels, at least one peak value feature point is extracted for each phase channel. The at least one peak value feature point of each phase channel is sorted to construct a respective peak value feature point sequence for said each phase channel. Specifically, in some embodiments, the at least one peak value feature point of each phase channel is sorted according to the time sequence from the first to the last peak value feature point. For the peak value feature points appeared in the same time point, in some embodiments, the peak value feature points are optionally sorted according to their frequencies from the highest frequency to the lowest frequency.

In some embodiments, this step can extract M peak value feature point sequences for the M phase channels, respectively. For example, in the M phase channels, phase channel 1 corresponds to peak value feature point sequence 1, phase channel 2 corresponds to peak value feature point sequence 2, and correspondingly, phase channel M corresponds to peak value feature point sequence M.

In conventional audio recognition technologies that calculate audio fingerprints in the frequency domain, such as that described in "A highly robust audio fingerprinting system", In Proc. of International Conference on Music Information Retrieval (ISMIR), Paris, France, 2002, by J. Haitsma and T. Kalker, the solution for phase mismatch between the samples in the audio database and the test sample is addressed by providing a large overlap between adjacent frames of audio signals. For example, in the above reference, the frame overlap is 31/32 of the frame size. However, simply increasing frame overlap size can increase the time and computation intensity of the FFT calculations, and also increase the bulk of the fingerprint data. In accordance with some embodiments of the present application, frame overlap size can be kept at a relatively small size, to avoid the above-mentioned issues of the conventional methods. Instead, the 2D time-frequency diagram of the audio signal is divided into different phase planes, and fingerprint information is extracted from each of multiple phase planes. For a given fingerprint size, the recall-rate of the present application can be improved over that of the conventional techniques. More details of how the multi-phase-plane fingerprint extraction and use are provided below.

In some embodiments, the extraction of the respective peak value feature point(s) for the different phase channels, and sorting the respective peak value feature point(s) into respective peak value feature point sequences for the different phase channels are performed on the client device. In some embodiments, the client device sends the respective peak value feature point sequences to the server for further processing. In some embodiments, the client device encrypt and/or compresses the respective peak value feature point sequences for the different phase channels before sending them to the server.

s1203, perform pairing processing for each peak value feature point in the peak value feature point sequence of each of the above-mentioned phase channels to form a peak value feature point pair sequence (or in other words, a sequence consisting of pairs of peak value feature points) of said each phase channel.

In some embodiments, $S''(t_k, f_k)$ is used to denote any peak value feature point k in the peak value feature point sequence of any phase channel n, where n represents the serial number of a respective phase channel or the serial number of a respective time-frequency sub-graph, and $0<n\leq M$; k represents the serial number of a respective peak value feature point in the peak value feature point sequence, and k is a positive integer; $t_k$ represents the time value for when the peak value feature point k appears in the time-frequency sub-graph n; $f_k$ represents the frequency value of the peak value feature point k in the time-frequency sub-graph n.

In this step, in some embodiments, the process of pairing processing of each peak value feature point in the peak value feature point sequence of each phase channel includes: (1) in the time-frequency sub-graph corresponding to each phase channel, taking each peak value feature point in the peak value feature point sequence of said each phase channel as an anchor point to select a rectangular target region; for any peak value feature point $S''(t_k, f_k)$ of any time-frequency sub-graph, the above-mentioned rectangular region satisfies the following conditions:

$t_{start} \leq t_k \leq t_{end}$ and $f_{start} \leq f_k \leq f_{end}$

In some embodiments, $t_{start}$ represents the starting time of the rectangular target region selected by taking the peak value feature point $S''(t_k, f_k)$ as an anchor point, $t_{end}$ represents the ending time of the rectangular target region selected by taking the peak value feature point $S''(t_k, f_k)$ as an anchor point; $f_{start}$ represents the minimum frequency of the rectangular target region selected by taking the peak value feature point $S''(t_k, f_k)$ as an anchor point, $f_{end}$ represents the maximum frequency of the rectangular target region selected by taking the peak value feature point $S''(t_k, f_k)$ as an anchor point.

(2) Selecting a peak value feature point other than the anchor point in rectangular target region to pair with the anchor point, and the anchor point and the peak value feature point selected to pair with the anchor point constitute a peak value feature point pair. In some embodiments, the principle for selecting the peak value feature point to pair with the anchor point include: selecting a peak value feature point whose epoch has the minimum time difference with epoch of the anchor point to pair with the anchor point; or selecting a peak value feature point that has the maximum energy value, excluding the anchor point, within the rectangular target region.

Through the above mentioned processing steps (1) and (2), each peak value feature point $S''(t_k, f_k)$ is provided with a matching peak value feature point $S''(t_b, f_b)$ in a pair. In some embodiments, n represents the serial number of the phase channel or the serial number of the time-frequency sub-graph, where 0<n≤M; b represents the serial number of the matching peak value feature point in the peak value feature point sequence n, and b is a positive integer; $t_b$ represents the time when the matching peak value feature point appears in the time-frequency sub-graph n; $f_b$ represents the frequency of the matching peak value feature point. In some embodiments, the quadruple $(t_k, f_k, \Delta f_k, \Delta t_k)_n$ is used to represent any given pair of peak value feature points k in the peak value feature point pair sequence of any given phase channel n, wherein, n representing the serial number of the phase channel or the serial number of the time-frequency sub-graph; $\Delta t_k$ represents the time different between two peak value feature points in the peak value feature point pair, $\Delta t_k = t_b - t_k$; $\Delta f_k$ represents the frequency difference between the two peak value feature points in peak value feature point pair, $\Delta f_k = f_b - f_k$.

This step allows the matching of each peak value feature point in M peak value feature point sequences to be conducted, to form M peak value feature point pair sequences. For example, in the M phase channels, phase channel 1 corresponds to peak value feature point pair sequence 1, phase channel 2 corresponds to peak value feature point pair sequence 2, correspondingly, phase channel M corresponds to peak value feature point pair sequence M.

s1204, conduct Hash calculation for each of the above-mentioned peak value feature point pair sequences in each phase channel to obtain a respective audio fingerprint sequence corresponding to each of the above-mentioned phase channels, where the collection of audio fingerprint sequences corresponding to the first preset number of phase channels together constitute the first characteristic information of the above-mentioned first audio document.

As mentioned above, the quadruple $(t_k, f_k, \Delta f_k, \Delta t_k)_n$ is used to represent any given peak value feature point pair k in the peak value feature point pair sequence of any given phase channel n. Parameters of the quadruple can be understood as the following: $(f_k, \Delta f_k, \Delta t_k)$ represents a characteristic section of the peak value feature point pair, $t_k$ represents the time when the characteristic section $(f_k, \Delta f_k, \Delta t_k)$ occurs. In this step, the Hash calculation for the characteristic section $(f_k, \Delta f_k, \Delta t_k)$ is conducted, and the characteristic section $(f_k, \Delta f_k, \Delta t_k)$ is thus expressed by a hashcode with a fixed number of bits. Specifically, hashcode$_k$=H($f_k, \Delta f_k, \Delta t_k$). Through the calculation of this step, any pair of peak value feature point pair in peak value feature point pair sequence of any phase channel can be expressed as $(t_k, \text{hashcode}_k)_n$, where n represents the respective serial number of the phase channel or the respective serial number of the time-frequency sub-graph, $t_k$ represents the time when the hashcode$_k$ appears; the $(t_k, \text{hashcode}_k)_n$ serves as an audio fingerprint item, representing a respective peak value feature point pair.

Through this step, in the M peak value feature point pair sequences, each peak value feature point pair in each peak value feature point pair sequence can be expressed by a respective audio fingerprint item; and each peak value feature point pair sequence corresponds to an audio fingerprint sequence; and M peak value feature point pair sequences correspond to M audio fingerprint sequences. For example: peak value feature point pair sequence 1 corresponds to audio fingerprint sequence 1, peak value feature point pair sequence 2 corresponds to audio fingerprint sequence 2, correspondingly, peak value feature point pair sequence M corresponds to audio fingerprint sequence M. The collection of M audio fingerprint sequences together constitutes the first characteristic information of the above-mentioned first audio document. That is to say, the first characteristic information of the first audio document can be expressed as the collection of M audio fingerprint sequences.

In some embodiments, the pairing of the peak value feature points and the calculation of the hashcodes for the peak value feature point pairs are performed on a server.

Figure 1C:
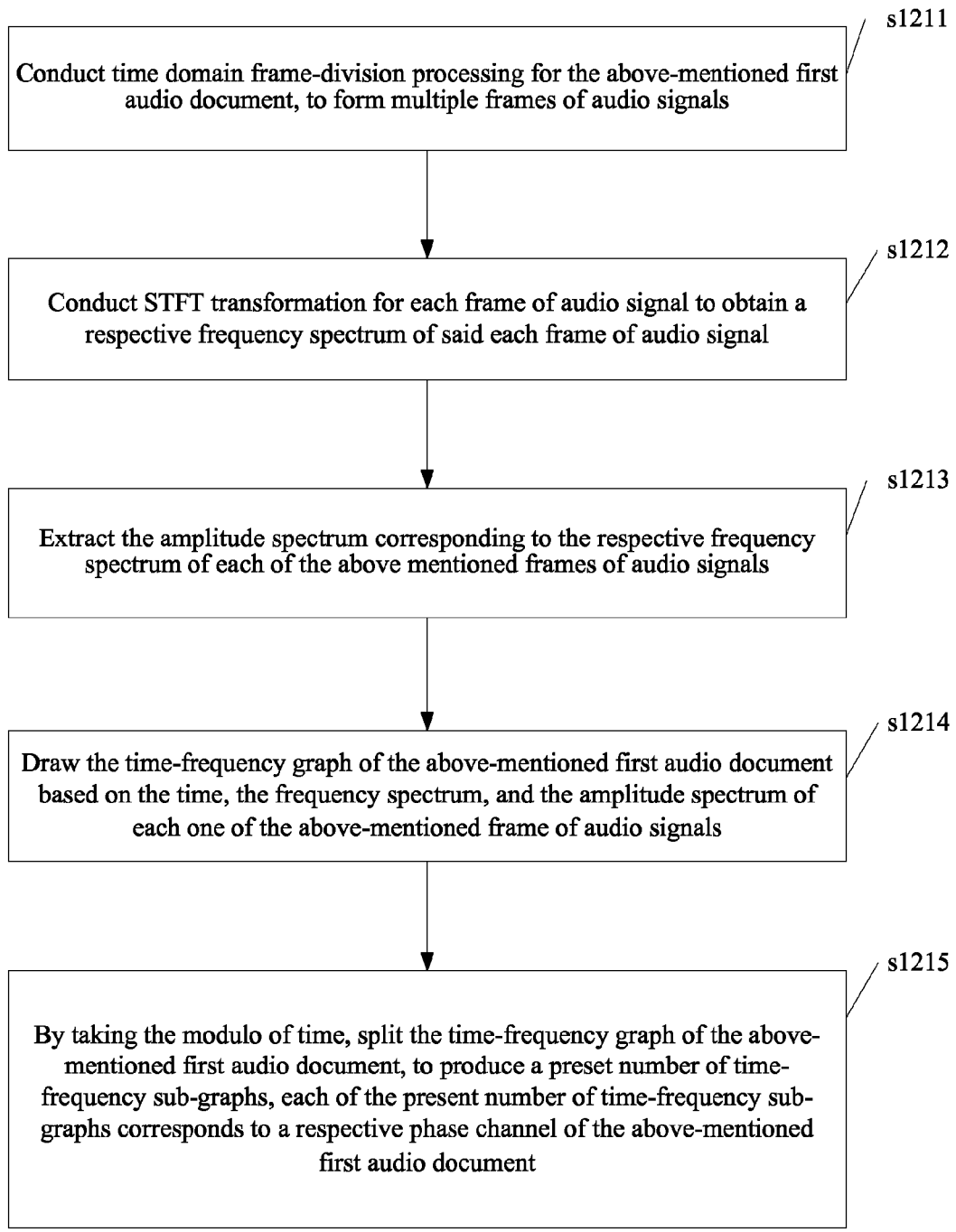
FIG. 1C is the flowchart diagram of Step s1201 shown in FIG. 1B in accordance with some embodiments.

Refer to FIG. 1C, which is the flowchart diagram of Step s1201 shown in FIG. 1B. The Step s1201 can include the following Step s1211-Step s1215, in accordance with some embodiments.

s1211, conduct time domain frame-division processing for the above-mentioned first audio document, to form multiple frames of audio signals.

This step takes a window function as a parameter of the frame-division, and conducts time domain frame-division processing for the collected first audio document, to form multiple frames of audio signals. In some embodiments, the window function is the Hamming window function, the Hanning window function, the Gaussian window function, or any other common window functions.

s1212, conduct STFT transformation for each frame of audio signal to obtain a respective frequency spectrum of said each frame of audio signal.

s1213, extract the amplitude spectrum corresponding to the respective frequency spectrum of each of the above mentioned frames of audio signals.

s1214, drawing the time-frequency graph of the above-mentioned first audio document based on the time, the frequency spectrum, and the amplitude spectrum of each one of the above-mentioned frame of audio signals. In this step, according to time sequence of each frame of audio signal, the frequency spectrum and the amplitude spectrum of each frame of audio signal is drawn in sequence, forming the two-dimensional time-frequency graph of the first audio document.

s1215, by taking the modulo of time, split the time-frequency graph of the above-mentioned first audio document, to produce a preset number of time-frequency sub-graphs, each of the present number of time-frequency sub-graphs corresponds to a respective phase channel of the above-mentioned first audio document.

In some embodiments, the first preset number is expressed as M, wherein M is a positive integer. In this step, the time-frequency graph of the first audio document is split in accordance with the time t modulo M, generating M time-frequency sub-graphs. In some embodiments, the specific splitting process is as follows: (1) select a respective feature point corresponding to each time t=0, M, 2M . . . xM respectively in the two dimensional time-frequency graph, and the selected feature points constitute the time-frequency sub-graph 1; select a respective feature point corresponding to each time t=1, 1+M, 1+2M . . . 1+xM respectively in the two dimensional time-frequency graph, and the selected feature points constitute the time-frequency sub-graph 2; correspondingly, select a respective feature point corresponding to each time t=M−1, (M−1)+M . . . (M−1)+xM respectively in the two dimensional time-frequency graph, and the selected feature points constitute the time-frequency sub-graph M. In some embodiments, x is a positive integer, and 0<(M−1)+xM≤$t_{max}$, in which $t_{max}$ is the maximum time point in the two dimensional time-frequency graph. In some embodiments, each time-frequency sub-graph corresponds to a respective phase channel of the first audio document, and the M time-frequency sub-graphs correspond to the M phase channels of the first audio document. For example: time-frequency sub-graph 1 corresponds to phase channel 1, time-frequency sub-graph 2 corresponds to phase channel 2, correspondingly, time-frequency sub-graph M corresponds to phase channel M.

Figure 1D:
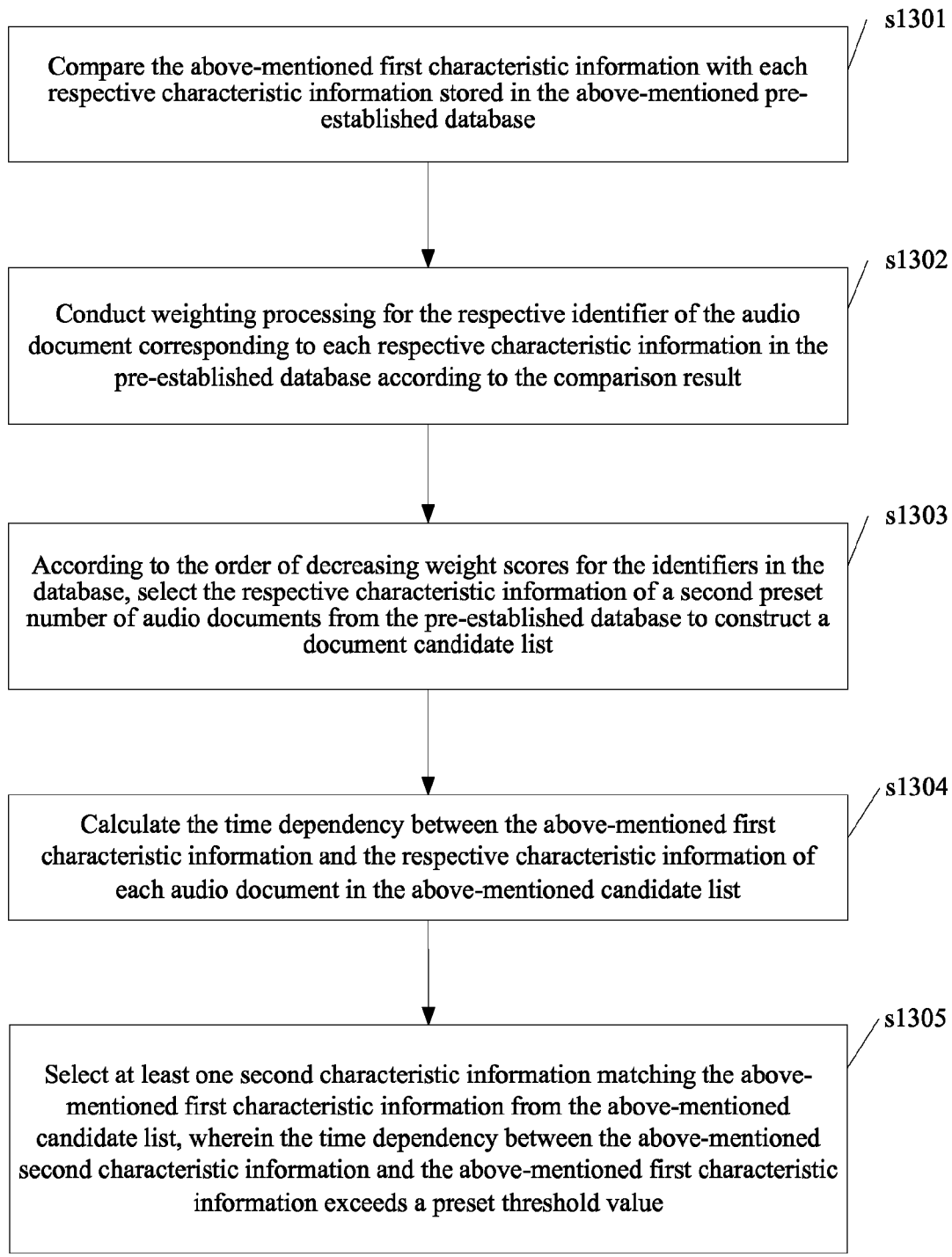
FIG. 1D is the flowchart diagram of Step S103 shown in FIG. 1A in accordance with some embodiments.

Refer to FIG. 1D, which is the flowchart diagram of Step S103 shown in FIG. 1A. In some embodiments, the Step S103 can include the following Step s1301-Step s1305.

s1301, compare the above-mentioned first characteristic information with each respective characteristic information stored in the above-mentioned pre-established database.

In some embodiments, the pre-established database stores the respective identifier of at least one audio document, the respective characteristic information of the at least one audio document, and the respective attribute data of the at least one audio document. In some embodiments, the attribute data of each audio document include at least one of the following data: the name of the audio document, album information of the audio document, the URL address of the audio document, and lyrics of the audio document. In some embodiments, the respective identifier of each audio document can be expressed by a respective TrackID. For example, the respective identifier of audio document 1 can be expressed as TrackID-1, the respective identifier of audio document 2 can be expressed as TrackID-2. In some embodiments, each unique TrackID is only used as the unique respective identifier for one audio document. In some embodiments, the characteristic information of an audio document is the audio fingerprint of the audio document. For example, the characteristic information of audio document 1 is the audio fingerprint of audio document 1, the characteristic information of audio document 2 is the audio fingerprint of audio document 2. Referring to the audio fingerprint described in the embodiments shown in FIG. 1C, the characteristic information of each audio document stored in the pre-established database is a respective collection of audio fingerprint sequences. Therefore, one audio fingerprint item of an audio document identified by a TrackID-d can be expressed as (TimeOffset$_i$,hashcode$_i$)$_p$, wherein, p serves as the respective serial number of the fingerprint sequence in the collection of fingerprint sequences; i serves as the respective serial number of fingerprint item in the fingerprint sequences;

TimeOffset$_i$ serves as the respective time offset of the hashcode$_i$ appearing in the fingerprint item. In some embodiments, in order to improve the query efficiency of the pre-established database, a Hash table can be used to reverse store the content of the above-mentioned pre-established database, and the structure of the Hash table is shown as follows:

TABLE I

Structure of Hash Table

| Key value | Value | | | | |
|---|---|---|---|---|---|
| 0x0001 | TrackID TimeOffset | TrackID TimeOffset | TrackID TimeOffset | TrackID TimeOffset | ... |
| 0x0002 | TrackID TimeOffset | TrackID TimeOffset | TrackID TimeOffset | TrackID TimeOffset | ... |
| 0x0003 | TrackID TimeOffset | TrackID TimeOffset | TrackID TimeOffset | TrackID TimeOffset | ... |
| 0x0004 | TrackID TimeOffset | TrackID TimeOffset | TrackID TimeOffset | TrackID TimeOffset | ... |
| ... | ... | ... | ... | ... | ... |
| 0xFFFF | TrackID TimeOffset | TrackID TimeOffset | TrackID TimeOffset | TrackID TimeOffset | ... |

In Table I, the Key value is the value of the hashcode in the fingerprint item, and the Value is the identifier (TrackID) of the audio document and the TimeOffset associated with the appearance of the hashcode value.

In this step, the above-mentioned first characteristic information is compared with each characteristic information in the above-mentioned pre-established database, and in fact, the hashcode value in each fingerprint item of the first characteristic information is compared with each Key value in the Hash table, e.g., the Hash table shown in the above-mentioned Table I.

s1302, conduct weighting processing for the respective identifier of the audio document corresponding to each respective characteristic information in the pre-established database according to the comparison result.

In the above-mentioned Step s1301, compare the hashcode value in each fingerprint item of the first characteristic information with the Key value in the Hash table. For example, suppose that the hashcode value in a fingerprint item of the first characteristic information is 0x0002, through the comparison made in Step s1301, the row where the Key value of 0x0002 in Hash table can be found. In this step, weighting processing is conducted to all of the TrackIDs having the Key value of 0x0002. In some embodiments, the weighting processing of this step can be conducted using weighting based on TF (Term Frequency)-IDF (Inverse Document Frequency) for each identified TrackID in the row 0x0002. After this step, each TrackID in the pre-established database will be given a corresponding a weight score, with the minimum weight score being 0. In some embodiments, other weighting methods can also be used.

s1303, according to the order of decreasing weight scores for the TrackIDs in the database, select the respective characteristic information of a second preset number of audio documents from the pre-established database to construct a document candidate list. In some embodiments, according to the order of decreasing weight scores of the TrackID, select the audio documents identified by the TrackIDs having the top R weight scores among all of the weight scores, and use the characteristic information of the selected R audio documents to construct the list of document candidates. In some embodiments, R is a positive integer.

s1304, calculate the time dependency between the above-mentioned first characteristic information and the respective characteristic information of each audio document in the above-mentioned candidate list.

As set forth above, the above-mentioned first characteristic information is the collection of M fingerprint sequences, and any given fingerprint item in the collection of M fingerprint sequences can be expressed as $(t_k, hashcode_k)_n$. There are R characteristic information included in the above-mentioned candidate list, with each characteristic information of the R characteristic information serving as a respective collection of fingerprint sequences. For example, the characteristic information A of the above-mentioned candidate list is collection A consisting of p fingerprint sequences. Any given fingerprint item of collection A can be expressed as $(TimeOffset_i, hashcode_i)_p$. In this step, the process of calculating the time dependencies can includes: (1) by using formula $\Delta t' = t_k - TimeOffset_i$, calculating in sequence the time difference between the fingerprint item contained in the first characteristic information and the respective fingerprint item contained in each characteristic information in the above-mentioned candidate list; (2) for each characteristic information contained in the candidate list, accounting the number of times that the same time difference occur for said each characteristic information. For example: for the characteristic information A in the above-mentioned candidate list, the accounting shows that $\Delta t'=20$ occurs 20 times, $\Delta t'=30$ occurs 40 times, $\Delta t'=35$ occurs 50 times based on the calculation results of step (1); and (3) For each characteristic information contained in the above-mentioned candidate list, selecting the maximum count amount the different counts obtained in step (2) to represent the respective time dependency between said each characteristic information of the above-mentioned candidate list and the first characteristic information. According to the aforementioned example, the metric value of time dependency between the characteristic information A in the candidate list and the first characteristic information is L=50 (i.e., the largest count among 20, 40, and 50).

According to the above steps (1)-(3), the metric value of time dependency L between each characteristic information of the R characteristic information in the candidate list and the first characteristic information can be obtained by calculation.

s1305, select at least one second characteristic information matching the above-mentioned first characteristic information from the above-mentioned candidate list, wherein the time dependency between the above-mentioned second characteristic information and the above-mentioned first characteristic information exceeds a preset threshold value.

In some embodiments, the above-mentioned candidate list is sorted according to the order from decreasing time dependency values, and then at least one second characteristic information matching the above-mentioned first characteristic information is selected from the above-mentioned candidate list, where the respective time dependency between the above-mentioned second characteristic information and the above-mentioned first characteristic information exceeds the preset threshold value. In some embodiments, the preset threshold value is set according to the current situation. It should be noted that, after the sorting of the candidate list, when none of the respective time dependencies between the first characteristic information and all the characteristic information in the candidate list exceed the preset threshold value, then it is concluded that there is no characteristic information matching the first characteristic information in the above-mentioned pre-established database, and that the first audio document cannot be recognized.

In some embodiments, the method of audio recognition includes: when receiving the audio recognition request, the first audio document to be recognized can be collected automatically. It is not necessary to input the basic information of the first audio document to be recognized manually, thus, this advances the intelligent functions of audio recognition. In addition, the method includes: calculating the first characteristic information of the above-mentioned first audio document; based on the first characteristic information, searching for the attribute data of a matched second audio document from a pre-established database, and taking the attribute data of the above-mentioned second audio document as the recognition result of the above-mentioned first audio document to output to the user. The embodiments of the present application use the characteristic information for audio recognition. When the audio document is identified, the characteristic information of that audio document is also determined Performing the audio recognition based on the determined characteristic information advances the accuracy of audio recognition and advances the intelligent functions of audio recognition as well.

The embodiments of the present application provide a kind of audio recognition system, which is used to perform the process of audio recognition methods in the mentioned implementation examples shown in FIG. 1A-FIG. 1D. There are various feasible implementation modes for the above-mentioned audio recognition methods. For example, in a first feasible implementation mode, the above-mentioned audio recognition system can be performed by an independent integrated device, which can be used to perform all of processes of the embodiments shown in FIGS. 1A-1D. In order to realize audio recognition process, in some embodiments, the above-mentioned audio recognition device can be client terminal or a server device.

In a second feasible implementation mode, the above-mentioned audio recognition methods can be performed by a first distributed device and a second distributed device together. The first distributed device and the second distributed device cooperate to perform all of processes of the embodiments shown in FIGS. 1A-1D in order to realize the audio recognition process. In some embodiments, the above-mentioned first distributed device can be a client terminal, and the above-mentioned second distributed device can be a server. As a person skilled in the art would appreciate, when the above-mentioned audio recognition system including the first distributed device and the second distributed device are used, the first distributed device and the second distributed device can utilize some technical processing measures during the cooperative process, such as conducting compression processing for data and so on to reduce data size transferred during the cooperative process, to improve the efficiency and speed of cooperative operation.

Figure 1E:
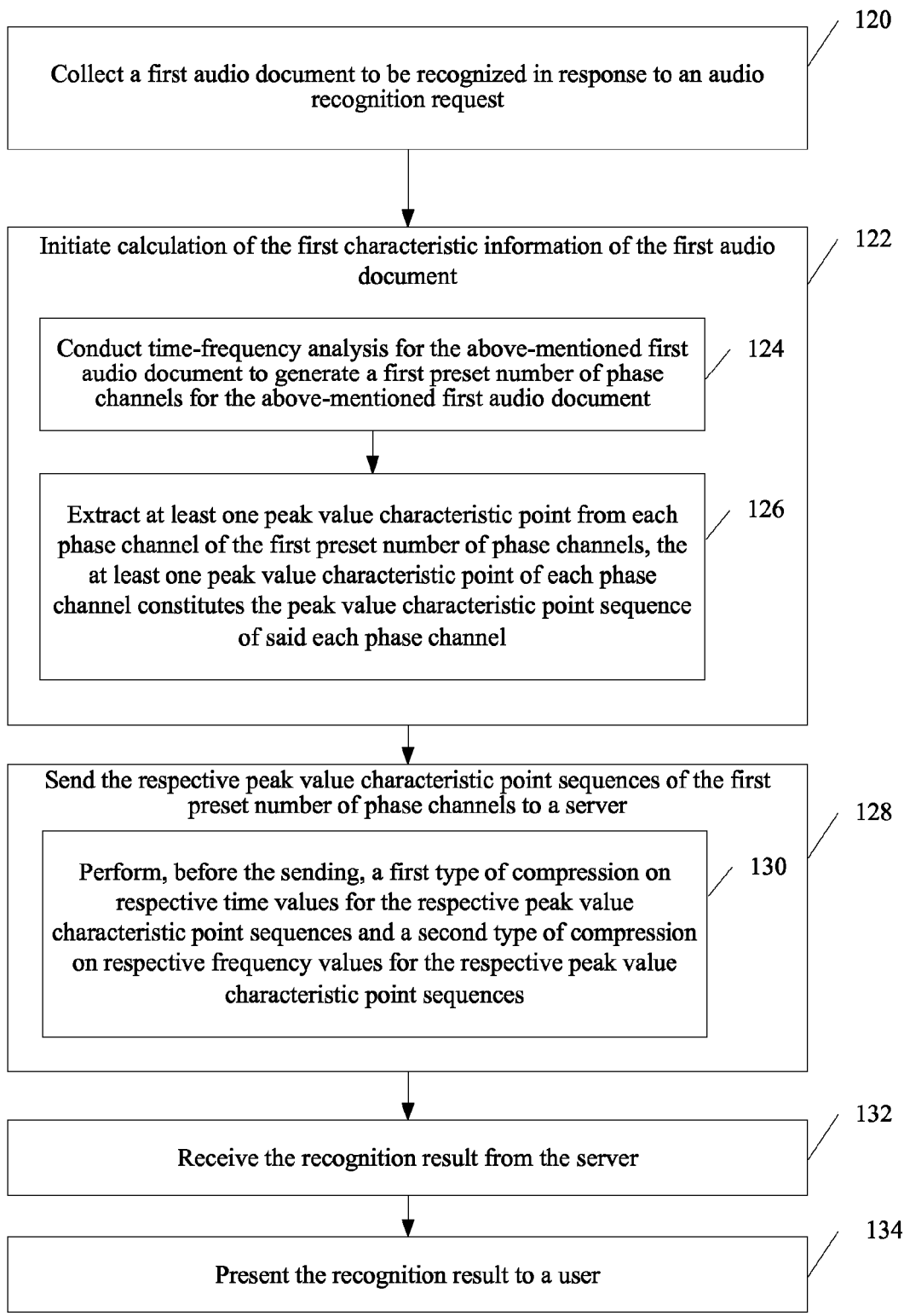
FIG. 1E is the flow diagram of an exemplary process performed on a client device in accordance with some embodiments.

As shown in FIG. 1E, a client device optionally performs a process having one or more of steps 120-134 during the audio recognition, in accordance with some embodiments. More details of the steps in FIG. 1E are provided above with respect to FIGS. 1A-1D and accompanying descriptions.

In some embodiments, a client device collects (120) a first audio document to be recognized in response to an audio recognition request. The client device then initiates (122) calculation of the first characteristic information of the first audio document, comprising: conducting (124) time-frequency analysis for the above-mentioned first audio document to generate a first preset number of phase channels for the above-mentioned first audio document and extracting (126) at least one peak value characteristic point from each phase channel in the first preset number of phase channels, where the at least one peak value characteristic point of each phase channel constitutes the peak value characteristic point sequence of said each phase channel. The client device then sends (128) the respective peak value characteristic point sequences of the first preset number of phase channels to a server. In some embodiments, the client device performs (130), before the sending, a first type of compression on respective time values for the respective peak value characteristic point sequences and a second type of compression on respective frequency values for the respective peak value characteristic point sequences. In some embodiments, the first type of compression simple9 compression, and the second type of compression is fixed bit compression. The client device receives recognition result from the server, where the server completes the calculation of the first characteristic information based on the received respective peak value characteristic point sequences of the preset number of phase channels and performs the recognition based on the calculated first characteristic information. The client device receives (132) the recognition result from the server, and presents (134) the result to a user.

Figure 1F:
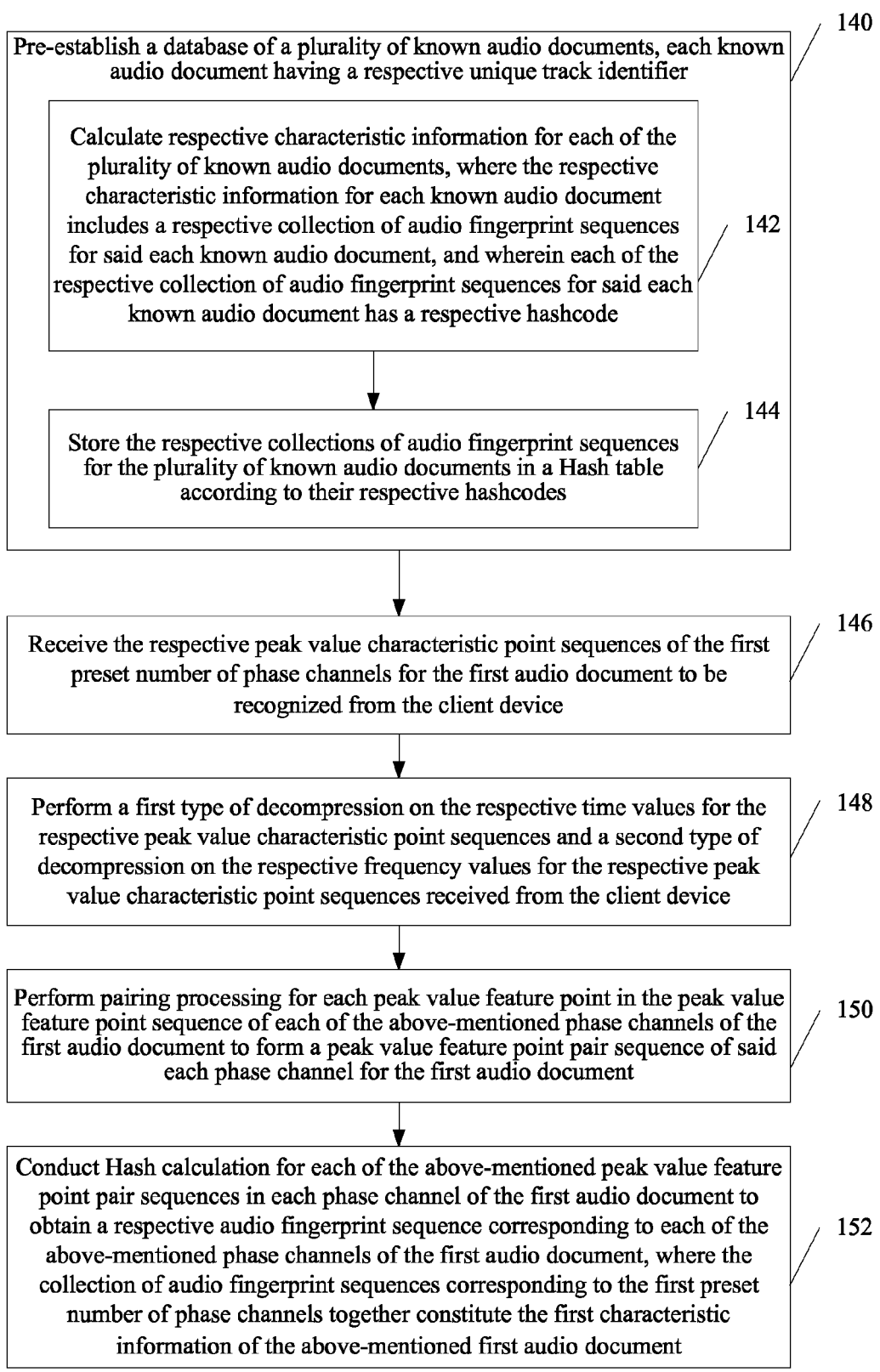
FIG. 1F is the flow diagram of an exemplary process performed on a server device in accordance with some embodiments.

As shown in FIG. 1F, a server optionally performs a process having one or more of steps 140-152 during preparation of the pre-established database on known audio documents, and the performance of the audio recognition, in accordance with some embodiments. More details of the steps in FIG. 1F are provided above with respect to FIGS. 1A-1D and accompanying descriptions.

As shown in FIG. 1F, in some embodiments, the server pre-establishes (140) a database of a plurality of known audio documents, each known audio document having a respective unique track identifier (e.g., TrackID). In some embodiments, to pre-establish the database, the server calculate (142) respective characteristic information for each of the plurality of known audio documents. In some embodiments, the method for calculating the respective characteristic information for each of the plurality of known audio documents is the same as that described above with respect to the calculation of the first characteristic information of the first audio document. In some embodiments, the respective characteristic information for each known audio document includes a respective collection of audio fingerprint sequences for said each known audio document, wherein each of the respective collection of audio fingerprint sequences for said each known audio document has a respective hashcode. The server stores (144) the respective collections of audio fingerprint sequences for the plurality of known audio documents in a Hash table according to their respective hashcodes. During subsequent audio recognition, the server receives (146) the respective peak value characteristic point sequences of the first preset number of phase channels for the first audio document to be recognized from the client device. In some embodiments, the server performs (148) a first type of decompression on the respective time values for the respective peak value characteristic point sequences and a second type of decompression on the respective frequency values for the respective peak value characteristic point sequences received from the client device. The server then performs (150) pairing processing for each peak value feature point in the peak value feature point sequence of each of the above-mentioned phase channels of the first audio document to form a peak value feature point pair sequence of said each phase channel for the first audio document. The server then conducts (152) Hash calculation for each of the above-mentioned peak value feature point pair sequences in each phase channel of the first audio document to obtain a respective audio fingerprint sequence corresponding to each of the above-mentioned phase channels of the first audio document, where the audio fingerprint sequences corresponding to the first preset number of phase channels together constitute the first characteristic information of the above-mentioned first audio document. The server then searches and obtains at least one second characteristic information matching the first characteristic information from the pre-established database. The server then obtains the attribute data of the second audio document corresponding to each of the second characteristic information in the above-mentioned at least one second characteristic information. The server then takes the attribute data of the above-mentioned second audio document as the recognition result of the mentioned first audio document to send to the client device.

The following will introduce the audio recognition device in accordance with some embodiments in detail based on FIGS. 2A-2D. The following audio recognition device can be applied in the above audio recognition methods.

Figure 2A:
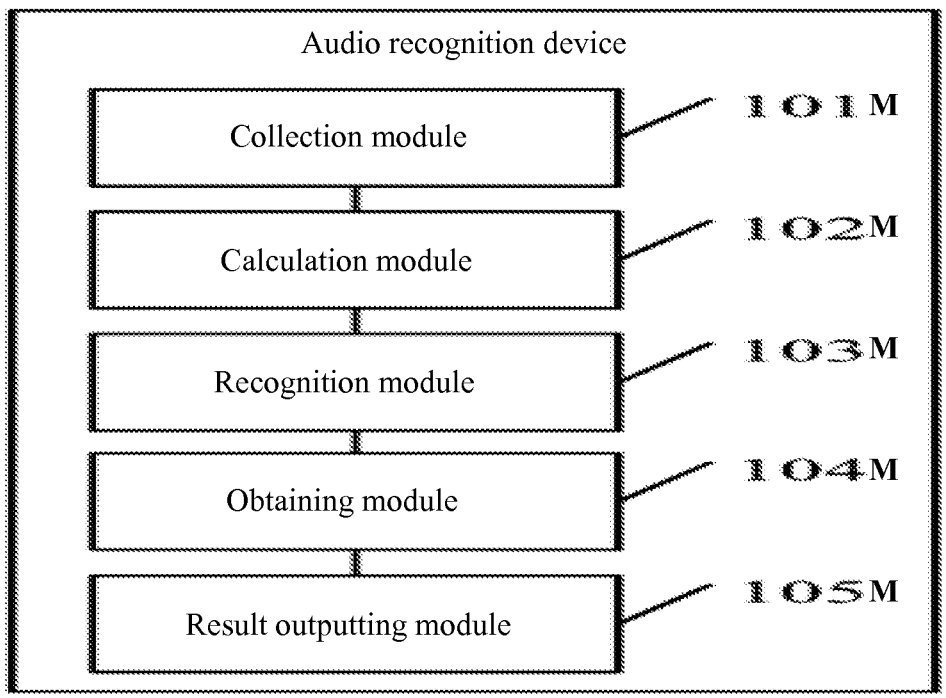
FIG. 2A is a structural schematic diagram of an audio recognition device in accordance with some embodiments.

Please refer to FIG. 2A, it is the structural schematic diagram of an audio recognition device in accordance with some embodiments; this device can include: collection module 101M, calculation module 102M, recognition module 103M, obtaining module 104M and result outputting module 105M.

Collection module 101M, configured to collect the first audio document to be recognized when receiving audio recognition request.

In some embodiments, the first audio document is one of: the audio segments in movies, the audio segments in television plays, the audio segments in television programs, the audio data broadcast by music radio stations, the audio data delivered by human beings (such as the hummed music or song segments), etc. If the user wants to know the information of an unknown audio document, such as the song's name, the singer, the album's name and the lyrics of the audio document, he or she can initiate the audio query request. When receiving the audio recognition request sent by user, the collection module 101M collects the first audio document to be recognized. In some embodiments, the collection module 101M can optionally include the following two implementation modes:

In the first implementation mode, when receiving the audio query request sent by user, the collection module 101M can start the recording function to record the first audio document requested to be recognized by the user in real-time.

In the second implementation mode, when receiving the audio query request sent by user, the collection module 101M can receive the first audio document requested to be recognized and uploaded by the user.

In some embodiments, the first audio document is a digital audio document with sampling frequency of 8 KHz, PCM (Pulse-code modulation) type with 16 bit quantization.

Calculation module 102M, configured to calculate the first characteristic information of the first audio document.

In some embodiments, the first characteristic information of the first audio document is the audio fingerprint of the first audio document. In some embodiments, the audio fingerprint of the first audio document refers to the compact digital signature representing the important acoustic characteristics of the first audio document, and based on the content of the first audio document. The digital version of the first audio document that has been collected is used by the calculation module 102M in the calculation to obtain the first characteristic information of the first audio document.

Recognition module 103M, configured to search and obtain at least one second characteristic information matching the first characteristic information from a pre-established database.

In some embodiments, the pre-established database stores the respective identifier of at least one audio document, the respective characteristic information of the at least one audio document, and the respective attribute data of the at least one audio document. In some embodiments, the audio documents stored in the pre-established database include: the audio segments in movies, the audio segments in television plays, the audio segments in television programs, songs, music and so on. In some embodiments, the respective identifiers of the audio documents are expressed by TrackIDs. For example, the respective identifier of audio document 1 can be expressed as TrackID-1, the respective identifier of audio document 2 can be expressed as TrackID-2; each TrackID can only be used as a unique identifier for one respective audio document.

In some embodiments, the characteristic information of an audio document is the audio fingerprint of the audio document. For example, the characteristic information of audio document 1 is the audio fingerprint of audio document 1, the characteristic information of audio document 2 is the audio fingerprint of audio document 2. In some embodiments, the attribute data of an audio document include but are not limited to at least one of the following data: the name of the audio document, album information of the audio document, URL address of the audio document, and lyrics of the audio document. In some embodiments, the second characteristic information matching the first characteristic information means that the second characteristic information is identical to the first characteristic information. In some embodiments, the second characteristic information matching the first characteristic information means that the degree of similarity between the second characteristic information and the first characteristic information reaches a preset degree of similarity. For example: if the preset degree of similarity is 90%, and if the degree of similarity between the second characteristic information and the first characteristic information reaches 90% or over 90%, the second characteristic information is considered to match the first characteristic information, e.g., by the recognition module 103M.

Obtaining module 104M, configured to obtain the attribute data of the second audio document corresponding to each of the second characteristic information in the above-mentioned at least one second characteristic information.

The above mentioned recognition module 103M searches out at least one second characteristic information matching the first characteristic information from the pre-established database. In some embodiments, each characteristic information in the above-mentioned at least one second characteristic information corresponds to a respective second audio document. By the above-mentioned recognition module 103M, at least one second audio document matching the first audio document is recognized, which suggests that this first audio document may be one of the recognized one or more second audio documents, or this first audio document may be an audio segment of at least one of the recognized second audio document(s). The attribute data of the recognized at least one second audio document matching the first audio document is obtained by the obtaining module 104M.

Result outputting module 105M, configured to take the attribute data of the above-mentioned second audio document as the recognition result of the mentioned first audio document to output. For example, in some embodiments, the server provides the attribute data of the above-mentioned second audio document to the client device as the result of the audio recognition request.

In some embodiments, the result outputting module 105M can use the attribute data of all audio documents in the at least one second audio document that have been obtained by the obtaining module 104M as the recognition result of the first audio document, and output them all to the user. In some embodiments, the result outputting module 105M can also select only some of the audio documents from the at least one audio document that have been obtained by the obtaining module 104M, and output the attribute data of the selected audio documents as the recognition result of the above-mentioned first audio document. According to the above-mentioned recognition result, the user can learn the attribute data of the first audio document that is the subject of the query request. For example, the user can learn the attribute data of the first audio document, such as the song's name, its singer, its album's name, its lyrics, and so on.

In some embodiments, the method of audio recognition include: when receiving an audio recognition request, the first audio document to be recognized can be collected automatically. It is not necessary for the user to manually input the basic information of the first audio document to be recognized, which advances the intelligent functions of audio recognition. In addition, the method of audio recognition include, calculating the first characteristic information of the above-mentioned first audio document; searching and obtaining at least one second characteristic information matching the above-mentioned first characteristic information in a pre-established database; based on the first characteristic information, obtaining the attribute data of the matched second audio document(s) from the preset database, and taking the attribute data of the above-mentioned second audio document(s) as the recognition result of the above-mentioned first audio document to output. Embodiments of the present application are based on the characteristic information for audio recognition, when the audio document is determined, the characteristic information of that audio document is also determined Performing the audio recognition based on the determined characteristic information advances the accuracy of audio recognition and advances the intelligent functions of audio recognition as well.

The following will introduce each module of audio recognition device shown in FIG. 2A in detail.

Figure 2B:
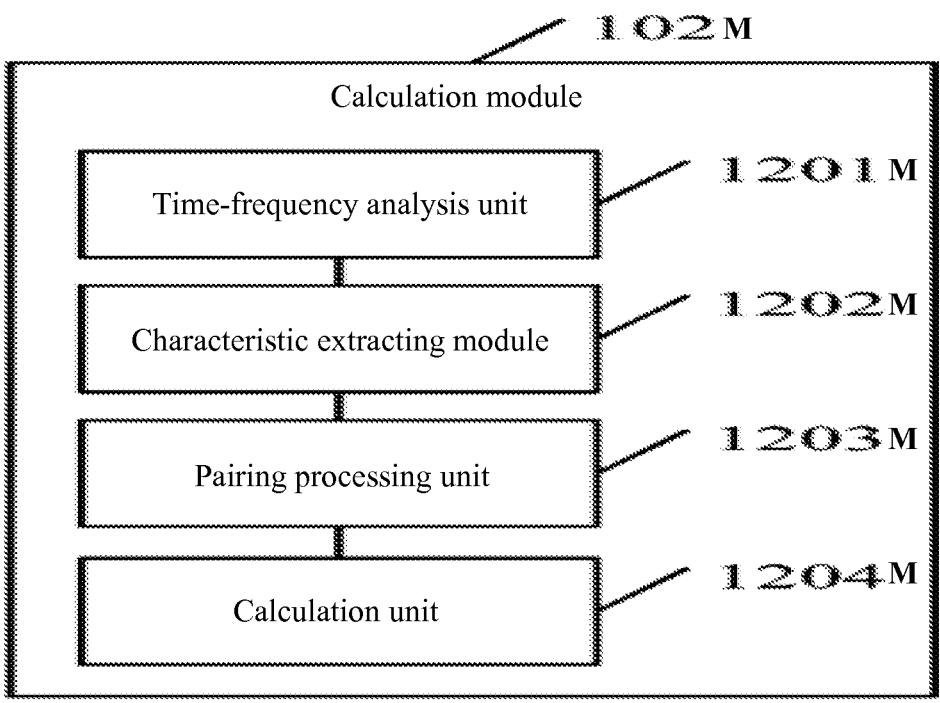
FIG. 2B is a structural schematic diagram of the calculation module shown in FIG. 2A in accordance with some embodiments.

Please refer to FIG. 2B, it is the structural schematic view of the calculation module shown in FIG. 2A. In some embodiments, this calculation module 102M can include: time-frequency analysis unit 1201M, characteristic extraction unit 1202M, pairing processing unit 1203M and calculation unit 1204M.

Time-frequency analysis unit 1201M, configured to conduct time-frequency analysis for the mentioned first audio document, to generate a first preset number of phase channels for the above-mentioned first audio document.

In some embodiments, the value of the first preset number is set according to the actual current condition. In some embodiments, the specific process for setting the value of the preset number takes into account various factors influenced by the first audio document. For example, the value of the first preset number can be set according to the signal to noise ratio of the first audio document, and so on.

In some embodiments, the first preset number is expressed as M, wherein M is a positive integer. In this step, the time-frequency analysis can be based on performing STFT (Short-Time Fourier Transform) on the time domain signal of the digital version of the first audio document, which can produce a two dimensional time-frequency graph of the first audio document. In some embodiments, the two dimensional time-frequency graph of the first audio document is split into M time-frequency sub-graphs, wherein each time-frequency sub-graph corresponds to a respective one of the M phase channels of the first audio document. For example, in the M time-frequency sub-graphs of the M phase channels, the phase channel 1 corresponds to the time-frequency sub-graph 1; the phase channel 2 corresponds to the time-frequency sub-graph 2; and correspondingly, the phase channel M corresponds to the time-frequency sub-graph M.

Characteristic extraction unit 1202M, configured to extract at least one peak value feature point from each phase channel of the preset number of phase channels, the at least one peak value feature point of said each phase channel forming the peak value feature point sequence of said each phase channel.

As mentioned above, in the M phase channels, each phase channel corresponds to a respective time-frequency sub-graph. In this step, in some embodiments, the process for extracting the peak value feature point(s) of each phase channel include: 1) in the respective time-frequency sub-graph corresponding to said each phase channel, analyzing the energy value of each feature point; 2) according to the energy value of each feature point, selecting the feature point having the maximum energy value within a given rectangular neighborhood as the peak value feature point. According to the above mentioned steps 1) and 2), at least one peak value feature point can be extracted for each phase channel.

In some embodiments, the size parameter of the rectangular neighborhood is set according to the actual need. For example, in some embodiments, the process for setting the size of the rectangular neighborhood takes into consideration one or more of the following factors, including: the total number of feature points in the time-frequency sub-graph, the distribution condition of the feature points in the time-frequency sub-graph, and so on. In some embodiments, in the M phase channels, at least one peak value feature point is extracted for each phase channel. The at least one peak value feature point of each phase channel is sorted to construct a respective peak value feature point sequence for said each phase channel. Specifically, in some embodiments, the at least one peak value feature point of each phase channel is sorted according to the time sequence from the first to the last peak value feature point. For the peak value feature points appeared in the same time point, in some embodiments, the peak value feature points are optionally sorted according to their frequencies from the highest frequency to the lowest frequency.

In some embodiments, this step can extract M peak value feature point sequences for the M phase channels, respectively. For example, in the M phase channels, phase channel 1 corresponds to peak value feature point sequence 1, phase channel 2 corresponds to peak value feature point sequence 2, and correspondingly, phase channel M corresponds to peak value feature point sequence M.

Pairing processing unit 1203M, configured to perform pairing processing for each peak value feature point in the peak value feature point sequence of each of the above-mentioned phase channels to form a peak value feature point pair sequence (or in other words, a sequence consisting of pairs of peak value feature points) of said each phase channel.

In some embodiments, $S''(t_k, f_k)$ is used to denote any peak value feature point k in the peak value feature point sequence of any phase channel n, where n represents the serial number of a respective phase channel or the serial number of a respective time-frequency sub-graph, and $0 < n \leq M$; k represents the serial number of a respective peak value feature point in the peak value feature point sequence, and k is a positive integer; $t_k$ represents the time value for when the peak value feature point k appears in the time-frequency sub-graph n; $f_k$ represents the frequency value of the peak value feature point k in the time-frequency sub-graph n.

In some embodiments, the process of pairing processing of each peak value feature point in the peak value feature point sequence of each phase channel includes: (1) in the time-frequency sub-graph corresponding to each phase channel, taking each peak value feature point in the peak value feature point sequence of said each phase channel as an anchor point to select a rectangular target region; for any peak value feature point $S''(t_k, f_k)$ of any time-frequency sub-graph, the above-mentioned rectangular region satisfies the following conditions:

$$t_{start} \leq t_k \leq t_{end} \text{ and } f_{start} \leq f_k \leq f_{end}$$

In some embodiments, $t_{start}$ represents the starting time of the rectangular target region selected by taking the peak value feature point $S''(t_k, f_k)$ as an anchor point, $t_{end}$ represents the ending time of the rectangular target region selected by taking the peak value feature point $S''(t_k, f_k)$ as an anchor point; $f_{start}$ represents the minimum frequency of the rectangular target region selected by taking the peak value feature point $S''(t_k, f_k)$ as an anchor point, $f_{end}$ represents the maximum frequency of the rectangular target region selected by taking the peak value feature point $S''(t_k, f_k)$ as an anchor point.

(2) Selecting a peak value feature point other than the anchor point in rectangular target region to pair with the anchor point, and the anchor point and the peak value feature point selected to pair with the anchor point constitute a peak value feature point pair. In some embodiments, the principle for selecting the peak value feature point to pair with the anchor point include: selecting a peak value feature point whose epoch has the minimum time difference with epoch of the anchor point to pair with the anchor point; or selecting a peak value feature point that has the maximum energy value, excluding the anchor point, within the rectangular target region.

Through the above mentioned processing steps (1) and (2), each peak value feature point $S''(t_k, f_k)$ is provided with a matching peak value feature point $S''(t_b, f_b)$ in a pair. In some embodiments, n represents the serial number of the phase channel or the serial number of the time-frequency sub-graph, where $0 < n \leq M$; b represents the serial number of the matching peak value feature point in the peak value feature point sequence n, and b is a positive integer; $t_b$ represents the time when the matching peak value feature point appears in the time-frequency sub-graph n; $f_b$ represents the frequency of the matching peak value feature point. In some embodiments, the quadruple $(t_k, f_k, \Delta f_k, \Delta t_k)_n$ is used to represent any given pair of peak value feature points k in the peak value feature point pair sequence of any given phase channel n, wherein, n representing the serial number of the phase channel or the serial number of the time-frequency sub-graph; $\Delta t_k$ represents the time different between two peak value feature points in the peak value feature point pair, $\Delta t_k = t_b - t_k$; $\Delta f_k$ represents the frequency difference between the two peak value feature points in peak value feature point pair, $\Delta f_k = f_b - f_k$.

The pairing processing module 1203M allows the matching of each peak value feature point in M peak value feature point sequences to be conducted, to form M peak value feature point pair sequences. For example, in the M phase channels, phase channel 1 corresponds to peak value feature point pair sequence 1, phase channel 2 corresponds to peak value feature point pair sequence 2, correspondingly, phase channel M corresponds to peak value feature point pair sequence M.

Calculation unit 1204M, configured to conduct Hash calculation for each of the above-mentioned peak value feature point pair sequences in each phase channel to obtain a respective audio fingerprint sequence corresponding to each of the above-mentioned phase channels, where the collection of audio fingerprint sequences corresponding to the first preset number of phase channels constitute the first characteristic information of the above-mentioned first audio document.

As mentioned above, the quadruple $(t_k, f_k, \Delta f_k, \Delta t_k)_n$ is used to represent any given peak value feature point pair k in the peak value feature point pair sequence of any given phase channel n. Parameters of the quadruple can be understood as the following: $(f_k, \Delta f_k, \Delta t_k)$ represents a characteristic section of the peak value feature point pair, $t_k$ represents the time when the characteristic section $(f_k, \Delta f_k, \Delta t_k)$ occurs. In this step, the Hash calculation for the characteristic section $(f_k, \Delta f_k, \Delta t_k)$ is conducted, and the characteristic section $(f_k, \Delta f_k, \Delta t_k)$ is thus expressed by a hashcode with a fixed number of bits. Specifically, $hashcode_k = H(f_k, \Delta f_k, \Delta t_k)$. Through the calculation of the calculation module 1204M, any pair of peak value feature point pair in peak value feature point pair sequence of any phase channel can be expressed as $(t_k, hashcode_k)_n$, where n represents the respective serial number of the phase channel or the respective serial number of the time-frequency sub-graph, $t_k$ represents the time when the $hashcode_k$ appears; the $(t_k, hashcode_k)_n$ serves as an audio fingerprint item, representing a respective peak value feature point pair.

Through the calculation of the calculation module 1204M, in the M peak value feature point pair sequences, each peak value feature point pair in each peak value feature point pair sequence can be expressed by a respective audio fingerprint item; and each peak value feature point pair sequence corresponds to an audio fingerprint sequence; and M peak value feature point pair sequences correspond to M audio fingerprint sequences. For example: peak value feature point pair sequence 1 corresponds to audio fingerprint sequence 1, peak value feature point pair sequence 2 corresponds to audio fingerprint sequence 2, correspondingly, peak value feature point pair sequence M corresponds to audio fingerprint sequence M. The collection of M audio fingerprint sequences together constitutes the first characteristic information of the above-mentioned first audio document. That is to say, the first characteristic information of the first audio document can be expressed as the collection of M audio fingerprint sequences.

Figure 2C:
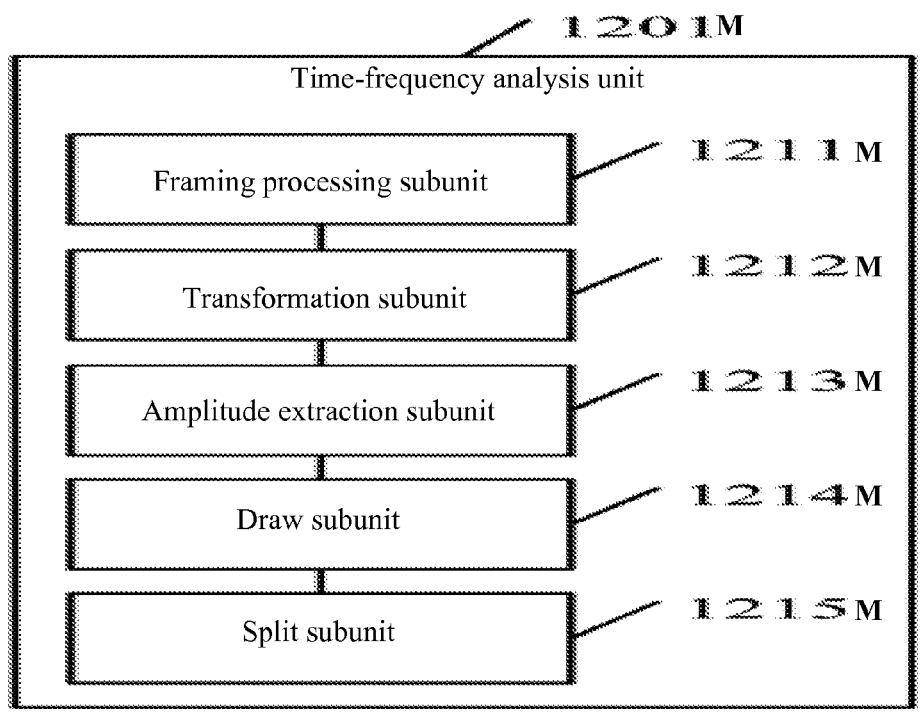
FIG. 2C is a structural schematic diagram of the time-frequency analysis unit shown in FIG. 2B in accordance with some embodiments.

Referring to FIG. 2C, which is the structural schematic diagram of the time-frequency analysis unit shown in FIG. 2B. This time-frequency analysis unit 1201M can include: framing processing subunit 1211M, transformation subunit 1212M, amplitude extraction subunit 1213M, draw subunit 1214M and split subunit 1215M.

Framing processing subunit 1211M, configured to conduct time domain frame-division processing for the above-mentioned first audio document, to form multiple frames of audio signals.

The framing processing subunit 1211M takes a window function as a parameter of the frame-division, and conducts time domain frame-division processing for the collected first audio document, to form multiple frames of audio signals. In some embodiments, the window function is the Hamming window function, the Hanning window function, the Gaussian window function, or any other common window functions.

Transformation subunit 1212M, configured to conduct STFT transformation for each frame of audio signal to obtain a respective frequency spectrum of said each frame of audio signal.

Amplitude extraction subunit 1213M, configured to extract the amplitude spectrum corresponding to the respective frequency spectrum of each of the above mentioned frames of audio signals.

Draw subunit 1214M, configured to drawing the time-frequency graph of the above-mentioned first audio document based on the time, the frequency spectrum, and the amplitude spectrum of each one of the above-mentioned frame of audio signals. In this step, according to time sequence of each frame of audio signal, the frequency spectrum and the amplitude spectrum of each frame of audio signal is drawn in sequence, forming the two-dimensional time-frequency graph of the first audio document.

Split subunit 1215M, configured to by taking the modulo of time, split the time-frequency graph of the above-mentioned first audio document, to produce a preset number of time-frequency sub-graphs, each of the present number of time-frequency sub-graphs corresponds to a respective phase channel of the above-mentioned first audio document.

In some embodiments, the first preset number is expressed as M, wherein M is a positive integer. The split subunit 1215M splits the time-frequency graph of the first audio document in accordance with the time t modulo M, generating M time-frequency sub-graphs. In some embodiments, the specific splitting process is as follows: (1) select a respective feature point corresponding to each time t=0, M, 2M . . . xM respectively in the two dimensional time-frequency graph, and the selected feature points constitute the time-frequency sub-graph 1; select a respective feature point corresponding to each time t=1, 1+M, 1+2M . . . 1+xM respectively in the two dimensional time-frequency graph, and the selected feature points constitute the time-frequency sub-graph 2; correspondingly, select a respective feature point corresponding to each time t=M−1, (M−1)+M . . . (M−1)+xM respectively in the two dimensional time-frequency graph, and the selected feature points constitute the time-frequency sub-graph M. In some embodiments, x is a positive integer, and $0 < (M-1) + xM \leq t_{max}$, in which $t_{max}$ is the maximum time point in the two dimensional time-frequency graph. In some embodiments, each time-frequency sub-graph corresponds to a respective phase channel of the first audio document, and the M time-frequency sub-graphs correspond to the M phase channels of the first audio document. For example: time-frequency sub-graph 1 corresponds to phase channel 1, time-frequency sub-graph 2 corresponds to phase channel 2, correspondingly, time-frequency sub-graph M corresponds to phase channel M.

Figure 2D:
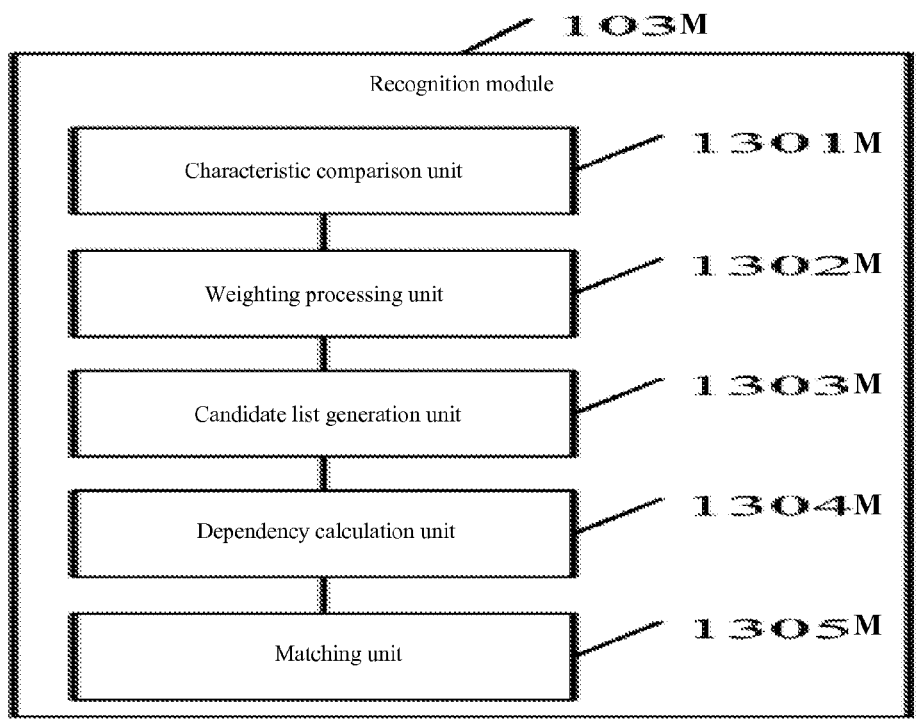
FIG. 2D is a structural schematic diagram of the recognition module shown in FIG. 2A in accordance with some embodiments.

Referring to FIG. 2D, which is the structural schematic diagram of the recognition module shown in FIG. 2A; this recognition module 103M can include: characteristic comparison unit 1301M, weighting processing unit 1302M, candidate list generation unit 1303M, dependency calculation unit 1304M and matching unit 1305M in accordance with some embodiments.

Characteristic comparison unit 1301M, configured to compare the above-mentioned first characteristic information with each characteristic information stored in the above-mentioned pre-established database.

In some embodiments, the pre-established database stores the respective identifier of at least one audio document, the respective characteristic information of the at least one audio document, and the respective attribute data of the at least one audio document. In some embodiments, the attribute data of each audio document include at least one of the following data: the name of the audio document, album information of the audio document, the URL address of the audio document, and lyrics of the audio document. In some embodiments, the respective identifier of each audio document can be expressed by a respective TrackID. For example, the respective identifier of audio document 1 can be expressed as TrackID-1, the respective identifier of audio document 2 can be expressed as TrackID-2. In some embodiments, each unique TrackID is only used as the unique respective identifier for one audio document. In some embodiments, the characteristic information of an audio document is the audio fingerprint of the audio document. For example, the characteristic information of audio document 1 is the audio fingerprint of audio document 1, the characteristic information of audio document 2 is the audio fingerprint of audio document 2. Referring to the audio fingerprint described in the embodiments shown in FIG. 1C, the characteristic information of each audio document stored in the pre-established database is a respective collection of audio fingerprint sequences. Therefore, one audio fingerprint item of an audio document identified by a TrackID-d can be expressed as $(TimeOffset_i, hashcode_i)_p$, wherein, p serves as the respective serial number of the fingerprint sequence in the collection of fingerprint sequences; i serves as the respective serial number of fingerprint item in the fingerprint sequences; $TimeOffset_i$ serves as the respective time offset of the hashcode appearing in the fingerprint item. In some embodiments, in order to improve the query efficiency of the pre-established database, a Hash table can be used to reverse store the content of the above-mentioned pre-established database, and the structure of the Hash table is shown in the above Table I.

The characteristic comparison unit 1301M compares the above-mentioned first characteristic information with each characteristic information in the above-mentioned pre-established database, in fact, it compares the hashcode value in each fingerprint item of the first characteristic information with each Key value in the Hash table, e.g., the Hash table shown in the above-mentioned Table I.

Weighting processing unit 1302M, configured to conduct weighting processing for the respective identifier of the audio document corresponding to each characteristic information in the pre-established database according to the comparison result.

The above-mentioned characteristic comparison unit 1301M compares the hashcode value in each fingerprint item of the first characteristic information with the Key value in the Hash table. For example, suppose that the hashcode value in a fingerprint item of the first characteristic information is 0x0002, through the comparison made in by the characteristic comparison unit 1301M, the row where the Key value of 0x0002 in Hash table can be found. Weighting processing is conducted by the weighting processing unit 1302M to all of the TrackIDs having the Key value of 0x0002. In some embodiments, the weighting processing can be conducted by the weighting processing unit 1302M using weighting based on TF (Term Frequency)-IDF (Inverse Document Frequency) for each identified TrackID in the row 0x0002. After the weighting processing, each TrackID in the pre-established database will be given a corresponding a weight score, with the minimum weight score being 0. In some embodiments, other weighting methods can also be used.

Candidate list generation unit 1303M, configured to according to the order of decreasing weight scores for the TrackIDs, select the respective characteristic information of a second preset number of audio documents from the pre-established database to construct a document candidate list. In some embodiments, according to the order of decreasing weight scores of the TrackID, the candidate list generation unit 1303M selects the audio documents identified by the TrackIDs having the top R weight scores among all of the weight scores, and uses the characteristic information of the selected R audio documents to construct the list of document candidates. In some embodiments, R is a positive integer.

Dependency calculation unit 1304M, configured to calculate the time dependency between the above-mentioned first characteristic information and the respective characteristic information of each audio document in the above-mentioned candidate list.

As set forth above, the above-mentioned first characteristic information is the collection of M fingerprint sequences, and any given fingerprint item in the collection of M fingerprint sequences can be expressed as $(t_k, hashcode_k)_n$. There are R characteristic information included in the above-mentioned candidate list, with each characteristic information of the R characteristic information serving as a respective collection of fingerprint sequences. For example, the characteristic information A of the above-mentioned candidate list is collection A consisting of p fingerprint sequences. Any given fingerprint item of collection A can be expressed as $(TimeOffset_i, hashcode_i)$. The process of calculating the time dependencies can includes: (1) by using formula $\Delta t' = t_k - TimeOffset_i$, calculating in sequence the time difference between the fingerprint item contained in the first characteristic information and the respective fingerprint item contained in each characteristic information in the above-mentioned candidate list; (2) for each characteristic information contained in the candidate list, accounting the number of times that the same time difference occur for said each characteristic information. For example: for the characteristic information A in the above-mentioned candidate list, the accounting shows that $\Delta t'=20$ occurs 20 times, $\Delta t'=30$ occurs 40 times, $\Delta t'=35$ occurs 50 times based on the calculation results of step (1); and (3) For each characteristic information contained in the above-mentioned candidate list, selecting the maximum count amount the different counts obtained in step (2) to represent the respective time dependency between said each characteristic information of the above-mentioned candidate list and the first characteristic information. According to the aforementioned example, the metric value of time dependency between the characteristic information A in the candidate list and the first characteristic information is L=50 (i.e., the largest count among 20, 40, and 50).

According to the above steps (1)-(3), the metric value of time dependency L between each characteristic information of the R characteristic information in the candidate list and the first characteristic information can be obtained by calculation.

Matching unit 1305M, configured to select at least one second characteristic information matching the above-mentioned first characteristic information from the above-mentioned candidate list, wherein the time dependency between the above-mentioned second characteristic information and the above-mentioned first characteristic information exceeds a preset threshold value.

In some embodiments, the above-mentioned candidate list is sorted according to the order from decreasing time dependency values, and then at least one second characteristic information matching the above-mentioned first characteristic information is selected from the above-mentioned candidate list, where the respective time dependency between the above-mentioned second characteristic information and the above-mentioned first characteristic information exceeds the preset threshold value. In some embodiments, the preset threshold value is set according to the current situation. It should be noted that, after the sorting of the candidate list, when none of the respective time dependencies between the first characteristic information and all the characteristic information in the candidate list exceed the preset threshold value, then it is concluded that there is no characteristic information matching the first characteristic information in the above-mentioned pre-established database, and that the first audio document cannot be recognized.

In the embodiments shown in FIG. 2A-FIG. 2D, in a first feasible implementation mode of the mentioned audio recognition device, the mentioned collection module 101M, the mentioned calculation module 102M, the mentioned recognition module 103M, the mentioned obtaining module 104M and the mentioned result outputting module 105M can be integrated in the same device to constitute the mentioned audio recognition device.

In a second feasible implementation mode of the mentioned audio recognition device, the mentioned collection module 101M can be situated in a first distributed device, the mentioned calculation module 102M, the mentioned recognition module 103M, the mentioned obtaining module 104M and the mentioned result outputting module 105M can be situated in a second distributed device, the first distribution device and the second distribution device commonly constituting the mentioned audio recognition device; or, the mentioned collection module 101M, the mentioned calculation module 102M can be situated in a first distributed device, the mentioned recognition module 103M, the mentioned obtaining module 104M and the mentioned result outputting module 105M can be situated in a second distributed device, the first distributed device and the second distributed device commonly constitute the mentioned audio recognition device; or, the mentioned collection module 101M, the time-frequency analysis unit 1201M and characteristic extraction unit 1202M in the mentioned calculation module 102M can be situated in a first distributed device, the pairing processing unit 1203M and calculation unit 1204M in the mentioned calculation module 102M, the mentioned recognition module 103M, the mentioned obtaining module 104M and the mentioned result outputting module 105M can be situated in a second distributed device, the first distributed device and the second distributed device commonly constitute the mentioned audio recognition device.

Figure 3B:
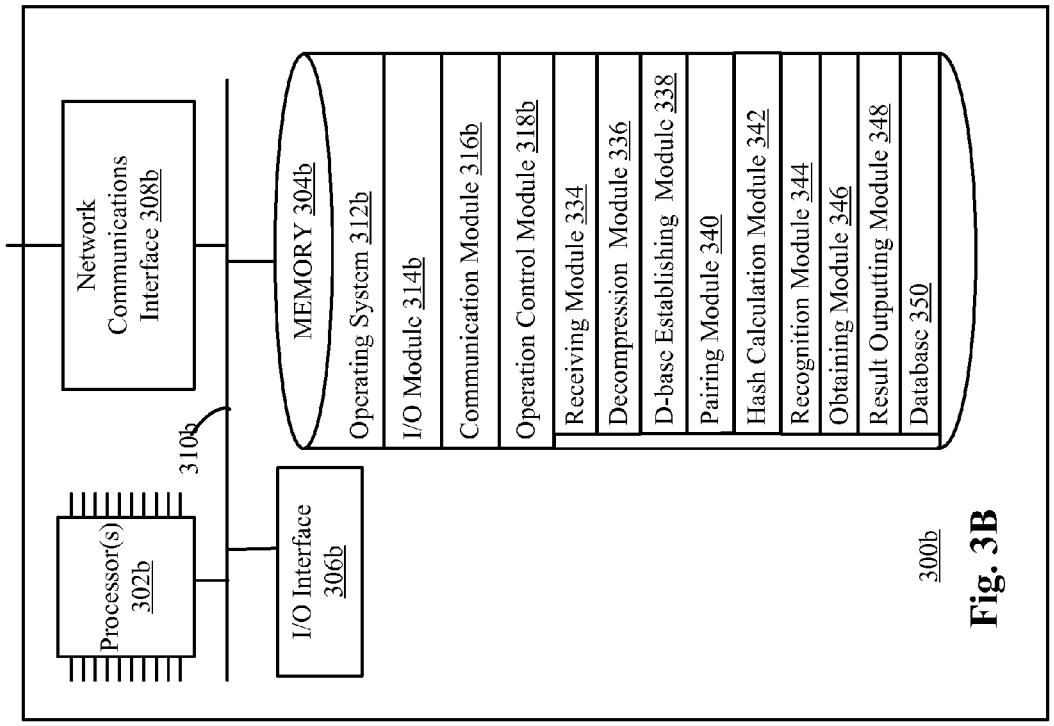
FIG. 3B is a block diagram of a server device in accordance with some embodiments.
Figure 3A:
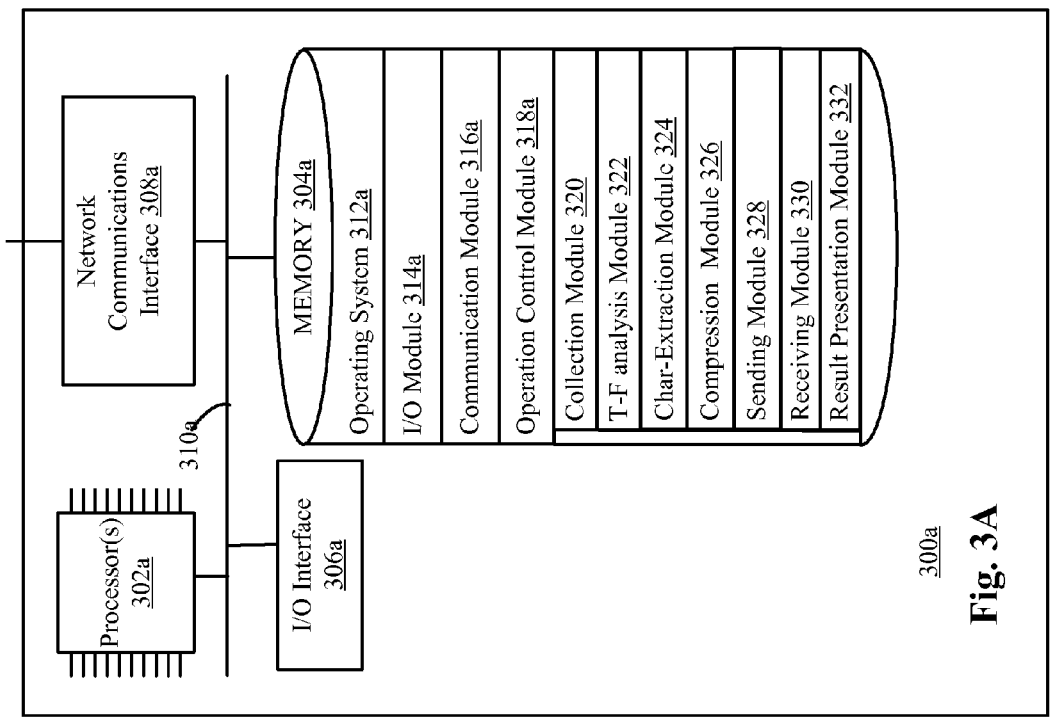
FIG. 3A is a block diagram of a client device in accordance with some embodiments.

FIG. 3A is a block diagram of an exemplary client device 300a participating in the audio recognition process described above in accordance with some embodiments. In some embodiments, the client device 300a includes one or more processors 302a, memory 304a for storing programs and instructions for execution by one or more processors 302a, one or more communications interfaces such as input/output interface 306a and network interface 308a, and one or more communications buses 310a for interconnecting these components.

In some embodiments, input/output interface 306a includes a display and input devices such as a keyboard, a mouse or a track-pad. In some embodiments, communication buses 310a include circuitry (sometimes called a chipset) that interconnects and controls communications between system components. In some embodiments, memory 304a includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 304a includes one or more storage devices remotely located from the one or more processors 302a. In some embodiments, memory 304a, or alternatively the non-volatile memory device(s) within memory 304a, comprises a non-transitory computer readable storage medium.

In some embodiments, memory 304a or alternatively the non-transitory computer readable storage medium of memory 304a stores the following programs, modules and data structures, instructions, or a subset thereof: Operating System 312a that includes procedures for handling various basic system services and for performing hardware dependent tasks; I/O module 314a that includes procedures for handling various basic input and output functions through one or more input and output devices; Communication module 316a that is used for communicating with other machines (e.g., server 300b) via one or more network communication interfaces 308a (wired or wireless) and one or more communication networks, such as the Internet, other wide area networks, local area networks, metropolitan area networks, and so on; and Operation control module 318a for controlling various functions of audio recognition.

In some embodiments, the operation control module 318a further includes the followings sub-modules, or a subset or superset thereof: a collection module 320, a time-frequency analysis module 322, a characteristic extraction module 324, a compression module 326, a sending module 328, a receiving module 330, a result presentation module 332. In some embodiments, the operation control module 318a optionally includes one or more other modules to provide other related functionalities described herein. More details on the structures, functions, and interactions of the sub-modules and data structures of the operation control module 318a are provided with respect to FIGS. 1A-2D, and accompanying descriptions.

FIG. 3B is a block diagram of an exemplary server device 300b participating in the audio recognition process described above in accordance with some embodiments. In some embodiments, the client device 300b includes one or more processors 302b, memory 304b for storing programs and instructions for execution by one or more processors 302b, one or more communications interfaces such as input/output interface 306b and network interface 308b, and one or more communications buses 310b for interconnecting these components.

In some embodiments, input/output interface 306b includes a display and input devices such as a keyboard, a mouse or a track-pad. In some embodiments, communication buses 310b include circuitry (sometimes called a chipset) that interconnects and controls communications between system components. In some embodiments, memory 304b includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 304b includes one or more storage devices remotely located from the one or more processors 302b. In some embodiments, memory 304b, or alternatively the non-volatile memory device(s) within memory 304b, comprises a non-transitory computer readable storage medium.

In some embodiments, memory 304b or alternatively the non-transitory computer readable storage medium of memory 304b stores the following programs, modules and data structures, instructions, or a subset thereof: Operating System 312b that includes procedures for handling various basic system services and for performing hardware dependent tasks; I/O module 314b that includes procedures for handling various basic input and output functions through one or more input and output devices; Communication module 316b that is used for communicating with other machines (e.g., client device 300a) via one or more network communication interfaces 308b (wired or wireless) and one or more communication networks, such as the Internet, other wide area networks, local area networks, metropolitan area networks, and so on; and Operation control module 318b for controlling various functions of audio recognition.

In some embodiments, the operation control module 318b further includes the followings sub-modules, or a subset or superset thereof: a receiving module 334, a decompression module 336, a database establishing module 338, a pairing module 340, a hash calculation module 342, a recognition module 344, an obtaining module 346, and a result outputting module 348. In some embodiments, the operation control module 318b further includes the pre-established database 350 and one or more other modules to provide other related functionalities described herein. More details on the structures, functions, and interactions of the sub-modules and data structures of the operation control module 318b are provided with respect to FIGS. 1A-2D, and accompanying descriptions.

FIGS. 7A and 7B are merely illustrative of the structures of a client device and a server performing audio recognition. A person skilled in the art would recognize that particular embodiments of a client device and a server may include more or fewer components than those shown. One or more modules may be divided into sub-modules, and/or one or more functions may be provided by different modules than those shown.

The foregoing description has been provided with reference to specific embodiments. However, the illustrative discussions above are not intended to be exhaustive or to be limiting to the precise forms disclosed. Many modifications and variations are possible in view of the above teachings. The embodiments were chosen and described in order to best explain the principles disclosed and their practical applications, to thereby enable others to best utilize the disclosure and various embodiments with various modifications as are suited to the particular use contemplated.

What is claimed is:

1. A method of performing audio recognition, comprising:
at a device having one or more processors and memory:
  collecting a first audio document to be recognized in response to an audio recognition request;
  determining first characteristic information of the first audio document by:
    calculating a short-term Fourier transform (STFT) for the first audio document, the STFT having M phase channels producing M sub-graphs in a frequency domain, each of the M sub-graphs corresponding to a distinct range of time in the first audio document, wherein M is a positive integer greater than or equal to two;
    for each sub-graph of the M sub-graphs in the frequency domain, extracting a respective sequence of one or more peak frequencies at which the sub-graph has a peak;
    in accordance with preset pairing criteria, pairing respective peak frequencies in the M sequences of one or more peak frequencies with another, distinct, peak frequency in the M sequences of one or more peak frequencies to produce a sequence of peak frequency pair values for each of the M sub-graphs;
    wherein the first characteristic information includes information corresponding to the M sequences of peak frequency pair values; and
  in accordance with preset matching criteria, matching the first characteristic information of the first audio document to second characteristic information of a second audio document to obtain a recognition result.

2. The method of claim 1, further comprising:
sending, to a server, the respective sequences of the one or more peak frequencies for the M sub-graphs, wherein the server completes the determination of the first characteristic information based on the respective sequences of the one or more peak frequencies for the M sub-graphs.

3. The method of claim 2, further including:
before sending, to the server, the respective sequences of the one or more peak frequencies for the M sub-graphs:
  performing a first type of compression on respective time values corresponding to each of the M sub-graphs and a second type of compression on respective frequency values in the respective sequences of the one or more peak frequencies for each of the M sub-graphs.

4. The method of claim 1, further comprising:
establishing a database of a plurality of known audio documents by, for each known audio document of the plurality of known audio documents:
  calculating a collection of audio fingerprint sequences comprising one or more audio fingerprints;
  calculating a hashcode for the collection of audio fingerprint sequences; and
  storing, as respective characteristic information for the known audio document, the collection of audio fingerprints in a hash table according to the hashcode.

5. The method of claim 4, wherein determining the first characteristic information further includes:
generating a collection of audio fingerprint sequences for the first audio document by calculating a hashcode for each peak frequency pair value of the M sequences of peak frequency pair values for the first audio document;
wherein the first characteristic information includes the collection of audio fingerprint sequences for the first audio document.

6. The method of claim 5, further comprising:
comparing the first characteristic information with the respective characteristic information of one or more of the known audio documents in the database;
weighting the one or more known audio documents according to the respective comparison result; and
in accordance with the weights for the one or more known audio documents, selecting a preset number of the one or more known audio documents to construct a document candidate list.

7. The method of claim 6, further comprising:
calculating a time dependency between the first characteristic information and the second characteristic information; and
in accordance with a determination that the time dependency between the second characteristic information and the first characteristic information exceeds a preset threshold value, selecting the second characteristic information as matching the first characteristic information.

8. A system for performing audio recognition, comprising:
one or more processors; and
memory storing instructions that, when executed by the one or more processors, cause the processors to perform operations comprising:
  collecting a first audio document to be recognized in response to an audio recognition request;
  determining first characteristic information of the first audio document by:
    calculating a short-term Fourier transform (STFT) for the first audio document, the STFT having M phase channels producing M sub-graphs in a frequency domain, each of the M sub-graphs corresponding to a distinct range of time in the first audio document, wherein M is a positive integer greater than or equal to two;

for each sub-graph of the M sub-graphs in the frequency domain, extracting a respective sequence of one or more peak frequencies at which the sub-graph has a peak;

in accordance with preset pairing criteria, pairing respective peak frequencies in the M sequences of one or more peak frequencies with another, distinct, peak frequency in the M sequences of one or more peak frequencies to produce a sequence of peak frequency pair values for each of the M sub-graphs;

wherein the first characteristic information includes information corresponding to the M sequences of peak frequency pair values; and in accordance with preset matching criteria, matching the first characteristic information of the first audio document to second characteristic information of a second audio document to obtain a recognition result.

9. The system of claim 8, wherein the operations further comprise:

sending, to a server, the respective sequences of the one or more peak frequencies for the M sub-graphs, wherein the server completes the determination of the first characteristic information based on the respective sequences of the one or more peak frequencies for the M sub-graphs.

10. The system of claim 9, wherein the operations further comprise:

before sending, to the server, the respective sequences of the one or more peak frequencies for the M sub-graphs:

performing a first type of compression on respective time values corresponding to each of the M sub-graphs and a second type of compression on respective frequency values in the respective sequences of the one or more peak frequencies for each of the M sub-graphs.

11. The system of claim 8, wherein the operations further comprise:

establishing a database of a plurality of known audio documents by, for each known audio document of the plurality of known audio documents:

calculating a collection of audio fingerprint sequences comprising one or more audio fingerprints;

calculating a hashcode for the collection of audio fingerprint sequences;

storing, as respective characteristic information for the known audio document, the collection of audio fingerprints in a hash table according to the hashcode.

12. The system of claim 11, wherein determining the first characteristic information further includes:

generating a collection of audio fingerprint sequences for the first audio document by calculating a hashcode for each peak frequency pair value of the M sequences of peak frequency pair values for the first audio document;

wherein the first characteristic information includes the collection of audio fingerprint sequences for the first audio document.

13. The system of claim 12, wherein the operations further comprise:

comparing the first characteristic information with the respective characteristic information of one or more of the known audio documents in the database;

weighting the one or more known audio documents according to the respective comparison result; and in accordance with the weights for the one or more known audio documents, selecting a preset number of the one or more known audio documents to construct a document candidate list.

14. The system of claim 13, wherein the operations further comprise:

calculating a time dependency between the first characteristic information and the second characteristic information; and in accordance with a determination that the time dependency between the second characteristic information and the first characteristic information exceeds a preset threshold value, selecting the second characteristic information as matching the first characteristic information.

15. A non-transitory computer-readable medium storing instructions that, when executed by one or more processors, cause the processors to perform operations comprising:

collecting a first audio document to be recognized in response to an audio recognition request;

determining first characteristic information of the first audio document by:

calculating a short-term Fourier transform (STFT) for the first audio document, the STFT having M phase channels producing M sub-graphs in a frequency domain, each of the M sub-graphs corresponding to a distinct range of time in the first audio document, wherein M is a positive integer greater than or equal to two;

for each sub-graph of the M sub-graphs in the frequency domain, extracting a respective sequence of one or more peak frequencies at which the sub-graph has a peak;

in accordance with preset pairing criteria, pairing respective peak frequencies in the M sequences of one or more peak frequencies with another, distinct, peak frequency in the M sequences of one or more peak frequencies to produce a sequence of peak frequency pair values for each of the M sub-graphs;

wherein the first characteristic information includes information corresponding to the M sequences of peak frequency pair values; and in accordance with preset matching criteria, matching the first characteristic information of the first audio document to second characteristic information of a second audio document to obtain a recognition result.

16. The non-transitory computer-readable medium of claim 15, wherein the operations further comprise:

sending, to a server, the respective sequences of the one or more peak frequencies for the M sub-graphs, wherein the server completes the determination of the first characteristic information based on the respective sequences of the one or more peak frequencies for the M sub-graphs.

17. The non-transitory computer-readable medium of claim 15, wherein the operations further comprise:

establishing a database of a plurality of known audio documents by, for each known audio document of the plurality of known audio documents:

calculating a collection of audio fingerprint sequences comprising one or more audio fingerprints;

calculating a hashcode for the collection of audio fingerprint sequences;

storing, as respective characteristic information for the known audio document, the collection of audio fingerprints in a hash table according to the hashcode.

18. The non-transitory computer-readable medium of claim 17, wherein determining the first characteristic information further includes:
   generating a collection of audio fingerprint sequences for the first audio document by calculating a hashcode for each peak frequency pair value of the M sequences of peak frequency pair values for the first audio document;
   wherein the first characteristic information includes the collection of audio fingerprint sequences for the first audio document.

19. The non-transitory computer-readable medium of claim 18, wherein the operations further comprise:
   comparing the first characteristic information with the respective characteristic information of one or more of the known audio documents in the database;
   weighting the one or more known audio documents according to the respective comparison result; and
   in accordance with the weights for the one or more known audio documents, selecting a preset number of the one or more known audio documents to construct a document candidate list.

20. The non-transitory computer-readable medium of claim 19, wherein the operations further comprise:
   calculating a time dependency between the first characteristic information and the second characteristic information; and
   in accordance with a determination that the time dependency between the second characteristic information and the first characteristic information exceeds a preset threshold value, selecting the second characteristic information as matching the first characteristic information.

* * * * *